United States Patent
Mizusawa

(10) Patent No.: US 10,063,293 B2
(45) Date of Patent: Aug. 28, 2018

(54) COMMUNICATION CONTROL APPARATUS, COMMUNICATION CONTROL METHOD AND TERMINAL APPARATUS

(71) Applicant: SONY CORPORATION, Tokyo (JP)

(72) Inventor: Nishiki Mizusawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/903,137

(22) PCT Filed: Jul. 7, 2014

(86) PCT No.: PCT/JP2014/068091
§ 371 (c)(1),
(2) Date: Jan. 6, 2016

(87) PCT Pub. No.: WO2015/033661
PCT Pub. Date: Mar. 12, 2015

(65) Prior Publication Data
US 2016/0173176 A1  Jun. 16, 2016

(30) Foreign Application Priority Data
Sep. 3, 2013 (JP) ................. 2013-182232

(51) Int. Cl.
*H04B 7/10* (2017.01)
*H04B 7/0456* (2017.01)
(Continued)

(52) U.S. Cl.
CPC ......... *H04B 7/0456* (2013.01); *H04B 7/0478* (2013.01); *H04B 7/0639* (2013.01);
(Continued)

(58) Field of Classification Search
CPC .. H04B 7/0478; H04B 7/0639; H04B 7/0617; H04B 7/0619
See application file for complete search history.

(56) References Cited

U.S. PATENT DOCUMENTS 8,976,884 B2* 3/2015 Krishnamurthy .... H04B 7/0413
370/252
2013/0072243 A1 3/2013 Yu et al.
2016/0050003 A1* 2/2016 Ko ....................... H04B 7/0469
370/329

FOREIGN PATENT DOCUMENTS

EP  2555445 A1  2/2013

OTHER PUBLICATIONS

Extended European Search Report of EP Patent Application No. 14842358.5, dated Mar. 1, 2017, 10 pages.
(Continued)

*Primary Examiner* — David S Huang
(74) *Attorney, Agent, or Firm* — Chip Law Group

(57) ABSTRACT

[Object] To make it possible to reduce load involved in beamforming.
[Solution] Provided is a communication control apparatus including: an acquisition unit configured to acquire a set of weight coefficients for forming a beam aimed at a terminal apparatus, for each of two or more antenna groups each including a portion of a plurality of antenna elements included in a directional antenna capable of forming a three-dimensional beam; and a determination unit configured to determine a set of weight coefficients for the plurality of antenna elements for forming a three-dimensional beam aimed at the terminal apparatus, on the basis of the sets of the weight coefficients for the two or more antenna groups.

18 Claims, 25 Drawing Sheets

(51) Int. Cl.
*H04W 16/28* (2009.01)
*H04B 7/06* (2006.01)
(52) U.S. Cl.
CPC .............. *H04B 7/10* (2013.01); *H04W 16/28* (2013.01); *H04B 7/0695* (2013.01)

(56) References Cited

OTHER PUBLICATIONS

"Considerations on CSI feedback enhancements for high-priority antenna configurations", Alcatel-Lucent Shanghai Bell, Alcatel-Lucent, 3GPP TSG-RAN WG1 #66, Aug. 22-26, 2011, 07 pages.

\* cited by examiner

FIG.3

| CODEBOOK INDEX | NUMBER OF LAYERS $v$ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{\sqrt{2}}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{\sqrt{2}}\begin{bmatrix}1 & 1\\j & -j\end{bmatrix}$ |
| 3 | $\frac{1}{\sqrt{2}}\begin{bmatrix}1\\-j\end{bmatrix}$ | — |

COMMUNICATION CONTROL APPARATUS, COMMUNICATION CONTROL METHOD AND TERMINAL APPARATUS

TECHNICAL FIELD

The present disclosure relates to communication control apparatuses, communication control methods, and terminal apparatuses.

BACKGROUND ART

A technique called "beamforming" has in recent years been widely known, which is used by a base station having a plurality of antenna elements to form a beam aimed at a terminal apparatus using the plurality of antenna elements. For example, Long Term Evolution (LTE) release 10 specifies that a base station is equipped with eight antennas.

According to beamforming, a beam aimed in a desired direction is formed by multiplying a signal of each antenna element by a weight coefficient. For example, according to LTE, a terminal apparatus selects a recommended one from sets of weight coefficients (i.e., precoding matrices) contained in a codebook, and notifies a base station of the recommended set of weight coefficients. Alternatively, a base station calculates a set of weight coefficients on the basis of a reference signal transmitted by a terminal apparatus.

For example, Patent Literature 1 describes a technique of using a combination of a first type of precoding weights and a second type of precoding weights.

CITATION LIST

Patent Literature

Patent Literature 1: JP 2013-528007T

SUMMARY OF INVENTION

Technical Problem

Incidentally, recent advances in antenna mounting technology may allow a base station to have a larger number of antenna elements (e.g., about 100 antenna elements). Such a large number of antenna elements are expected to allow for formation of a sharp beam. Moreover, a beam aimed in a desired three-dimensional direction can be formed by providing antenna elements on a plane.

However, according to the background art including the above technique described in Patent Literature 1, an increase in the number of antenna elements possessed by a base station may be accompanied by an increase in load involved in beamforming. As an example, an increase in the number of antenna elements is accompanied by an increase in the number of weight coefficients, which in turn increases a process for calculating the set of weight coefficients. In other words, load increases in terms of a process performed by a terminal apparatus or a base station. As another example, an increase in the number of antenna elements is accompanied by an increase in the size of a codebook, and therefore, it is necessary to allocate more radio resources for notification of the recommended set of weight coefficients, resulting in an increase in overhead. In other words, load increases in terms of radio resources. As still another example, an increase in the number of antenna elements is accompanied by an increase in the number of reference signals, and therefore, it is necessary to allocate more radio resources for transmission of reference signals, resulting in an increase in overhead. In other words, load increases in terms of radio resources.

With the above in mind, it is desirable to provide an arrangement capable of reducing load involved in beamforming.

Solution to Problem

According to the present disclosure, there is provided a communication control apparatus including: an acquisition unit configured to acquire a set of weight coefficients for forming a beam aimed at a terminal apparatus, for each of two or more antenna groups each including a portion of a plurality of antenna elements included in a directional antenna capable of forming a three-dimensional beam; and a determination unit configured to determine a set of weight coefficients for the plurality of antenna elements for forming a three-dimensional beam aimed at the terminal apparatus, on the basis of the sets of the weight coefficients for the two or more antenna groups.

According to the present disclosure, there is provided a communication control method including: acquiring a set of weight coefficients for forming a beam aimed at a terminal apparatus, for each of two or more antenna groups each including a portion of a plurality of antenna elements included in a directional antenna capable of forming a three-dimensional beam; and determining a set of weight coefficients for the plurality of antenna elements for forming a three-dimensional beam aimed at the terminal apparatus, on the basis of the sets of the weight coefficients for the two or more antenna groups.

According to the present disclosure, there is provided a terminal apparatus including: a determination unit configured to determine a recommended set of weight coefficients for forming a beam aimed at the terminal apparatus, for each of two or more antenna groups each including a portion of a plurality of antenna elements included in a directional antenna capable of forming a three-dimensional beam, on the basis of reception of a reference signal transmitted by each of the two or more antenna groups; and a notification unit configured to notify of the recommended set for each of the two or more antenna groups. The recommended sets for the two or more antenna groups are information used to determine a set of weight coefficients for the plurality of antenna elements for forming a three-dimensional beam aimed at the terminal apparatus.

Advantageous Effects of Invention

As described above, according to the present disclosure, load involved in beamforming can be reduced. Note that the above advantageous effects are not necessarily limiting, and in addition or instead of the above advantageous effects, any advantageous effects described herein or other advantageous effects obvious herefrom may be achieved.

BRIEF DESCRIPTION OF DRAWINGS

FIG. 3 is an illustrative diagram for describing an example of a codebook that specifies a precoding matrix.

DESCRIPTION OF EMBODIMENTS

Figure 1:
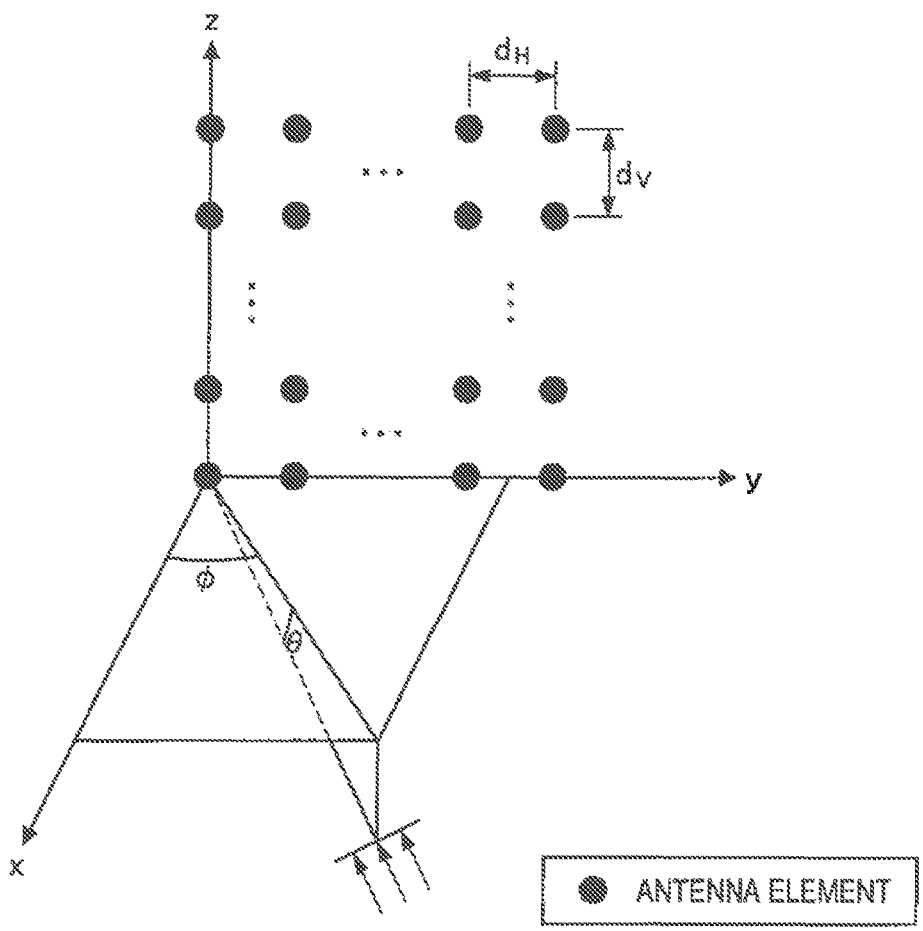
FIG. 1 is an illustrative diagram for describing a relationship between the position of each antenna element and the three-dimensional direction of a beam.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

Also, in the present specification and the accompanying drawings, substantially the same components may be distinguished from each other by a different alphabetical letter added to the same reference sign. For example, substantially the same components are distinguished from each other when necessary, like a three-dimensional beam 20A and a three-dimensional beam 20B. Note that when substantially the same components do not have to be particularly distinguished from each other, these components are indicated only by the same reference sign. For example, when the three-dimensional beam 20A and the three-dimensional beam 20B do not have to be particularly distinguished from each other, these components are simply referred to as three-dimensional beams 20.

Note that description will be provided in the following order.
 1. Introduction
 2. Schematic Configuration Of Communication System
 3. Configuration Of Each Communication Node
 3.1. Configuration Of Base Station
 3.2. Configuration Of Terminal Apparatus
 4. Flow Of Process
 5. Variations
 5.1. First Variation
 5.2. Second Variation
 5.3. Third Variation
 5.4. Fourth Variation
 6. Application Examples
 6.1. Application Examples Regarding Base Station
 6.2. Application Examples Regarding Terminal Apparatus
 7. Conclusion 1. Introduction Firstly, trends relating to beamforming, various techniques relating to beamforming, and problems relating to beamforming will be described with reference to FIG. 1 to FIG. 5.

(Trends Relating to Beamforming)

Given the recent widespread use of mobile data communication terminals, it is urgently necessary to address explosively increasing traffic. To this end, the Third Generation Partnership Project (3GPP) is studying techniques of increasing communication capacity, such as multi-user multiple-input and multiple-output (MU-MIMO), coordinated multipoint transmission/reception (CoMP), and the like.

LTE release 10 specifies that a base station is equipped with eight antennas. Therefore, the antennas can be used to achieve eight-layer multiple-input and multiple-output (MIMO) in the case of single-user MIMO (SU-MIMO). Eight-layer MIMO is a technique of spatially multiplexing eight separate streams. Also, four-user two-layer MU-MIMO can be achieved.

Terminal apparatuses have only a small space for accommodating antennas, and limited processing capability, and therefore, it is difficult to increase the number of antennas in a terminal apparatus. Meanwhile, recent advances in antenna mounting technology have made it possible to provide about 100 antennas in a base station.

It is expected that a base station thus equipped with about 100 antennas will have a narrower half-width (an angle at which the antenna gain is −3 dB) of a beam formed by the antennas. In other words, it is expected that it will be possible to form a sharp beam. Moreover, the arrangement of antenna elements on a plane will allow for formation of a beam aimed in a desired three-dimensional direction. It has been proposed that such a beam aimed in a three-dimensional direction is used to transmit a signal to a specific building located higher than a base station.

Also, the increase in the number of antennas allows for an increase in the number of MU-MIMO users. When the number of antennas of a terminal apparatus is two, the number of spatially separated streams is two for each terminal apparatus, and therefore, it is more reasonable to increase the number of MU-MIMO users than to increase the number of streams for each terminal apparatus. For the above various reasons, beamforming in downlink of LTE is expected to be advanced.

As the number of antennas increases, a sharper beam can be formed, and more sectors can be formed, and therefore, the number of users multiplexed per base station can be increased.

(Technique for Calculating Weight Coefficients for 3D Beamforming)

The weight coefficient of each antenna element for beamforming is represented by a complex number. This will be specifically described with reference to FIG. 1.

FIG. 1 is an illustrative diagram for describing a relationship between the position of each antenna element and the three-dimensional direction of a beam. Referring to FIG. 1, shown are antenna elements arranged in a grid pattern. Also, shown are two orthogonal axes z and y on a plane on which the antenna elements are placed, and an axis x perpendicular to the plane. Here, the direction of a beam to be formed is represented by, for example, an angle phi (Greek letter) and an angle theta (Greek letter). The angle phi (Greek letter) is an angle between the xy-plane component of the beam direction and the x-axis. Also, the angle theta (Greek letter) is an angle between the beam direction and the xy-plane (e.g., when the xy-plane is parallel to the horizontal plane, the angle theta is an angle between the beam direction and the horizontal plane). In this case, for example, the weight coefficient $V_{m,n}$ of an antenna element that is m-th in the z-axis direction and n-th in the y-axis direction may be represented as follows.

$$V_{m,n}(\theta, \varphi, f) = \exp\left(j2\pi \frac{f}{c}((m-1)\cdot d_V \cdot \sin(\theta) + (n-1)\cdot d_H \cdot \cos(\theta) \cdot \sin(\varphi))\right) \quad [\text{Math 1}]$$

In the above formula, f is a frequency, and c is the speed of light. Also, j is the imaginary unit of a complex number. Also, $d_v$ is an interval between each antenna element in the z-axis direction, and $d_H$ is an interval between each antenna element in the y-axis direction. Note that the coordinates of an antenna element are represented as follows.

$$z=(m-1)d_V, \ y=(n-1)d_H \quad [\text{Math 2}]$$

After a desired three-dimensional direction has been determined, the weight coefficient of each antenna element can be obtained on the basis of the direction and the frequency f. Such weight coefficients are used as shown in, for example, FIG. 2.

Figure 2:
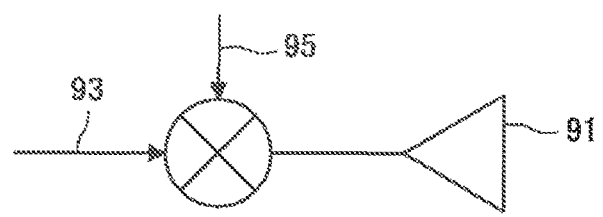
FIG. 2 is an illustrative diagram for describing an example of a technique of using weight coefficients for beamforming.

FIG. 2 is an illustrative diagram for describing an example of a technique of using weight coefficients for beamforming. Referring to FIG. 2, a transmission signal 93 corresponding to each antenna element 91 is complex-multiplied by the weight coefficient 95 of the antenna element 91. Thereafter, the transmission signal complex-multiplied by the weight coefficient 95 is transmitted from the antenna element 91. For example, the complex multiplication of the weight coefficient 95 is performed on a digital signal.

Although an example of the technique of calculating weight coefficients has been described, the weight coefficient calculation technique is not limited to this. Various calculation techniques may be applicable.

(Beamforming in LTE)

Beamforming in LTE is roughly divided into schemes in which precoding based on a codebook is used and schemes in which precoding not based on a codebook is used. Also, the schemes in which precoding based on a codebook is used include closed-loop techniques and open-loop techniques.

Schemes in which Precoding Based on Codebook is Used

A base station transmits different unique reference signals (e.g., cell-specific reference signals (CRSs)) from up to four different antennas, for example. A terminal apparatus estimates channel characteristics by measuring CRSs corresponding to the number of transmission antennas of a base station, and calculates an optimum set of weight coefficients (precoding matrix) that provides signal quality that satisfies predetermined conditions. For example, a terminal apparatus calculates a preooding matrix that maximizes the signal to interference and noise power ratio (SINR) of a received signal.

To avoid an increase in overhead caused by notification of the optimum precoding matrix itself a terminal apparatus selects a precoding matrix that is closest to the optimum precoding matrix, from candidate precoding matrices in a codebook, and notifies a base station of the selected precoding matrix. A specific example of a codebook will be described with reference to FIG. 3.

FIG. 3 is an illustrative diagram for describing an example of a codebook that specifies a precoding matrix. Referring to FIG. 3, shown is a codebook containing four candidate precoding matrices where the number of layers is one, and four candidate precoding matrices where the number of layers is two. The codebook is specified in Table 6.3.4.2.3-1 of TS36.211 of 3GPP. The number of rows and the number of columns in a codebook are based on the number of transmission antennas and the number of layers (the number of data streams), respectively. For example, a terminal apparatus determines an optimum candidate precoding matrix from the four candidate precoding matrices where the number of layers is one, and notifies a base station of the determined candidate precoding matrix as a recommended precoding matrix. The recommended precoding matrix is notified by notifying of a codebook index corresponding to the recommended precoding matrix. For example, a base station transmits data addressed to a terminal apparatus using a recommended precoding matrix notified (closed-loop technique). Meanwhile, when a base station does not use a recommended precoding matrix, the base station notifies a terminal apparatus of a codebook index corresponding to a precoding matrix used (open-loop technique). Note that a recommended precoding matrix can be said to be a recommended set of weight coefficients. A codebook index is also called, for example, a precoding matrix indicator (PMI).

Note that a codebook that is used when the number of antennas is four is specified in Table 6.3.4.2.3-2 of TS36.211 of 3GPP. Also, a codebook for channel state information (CSI) reporting with respect to a CSI reference signal, that is used when the number of antennas is eight, is specified in Table 7.2.4-1 of TS36.213 of 3GPP.

Schemes in which Precoding not Based on Codebook is Used

Beamforming where the number of layers is up to eight is applicable to a scheme in which precoding not based on a codebook is used. In this scheme, a terminal apparatus does not determine or notify of a recommended precoding matrix, and a base station may use any precoding matrix.

For example, a terminal apparatus transmits a reference signal (sounding reference signal) specific to the terminal apparatus using an uplink. Thereafter, a base station estimates a channel matrix and calculates an optimum precoding matrix on the basis of reception of the sounding reference signal.

Note that when FDD is employed as a duplex scheme, a frequency band in which a sounding reference signal is transmitted is different from a frequency band in which a downlink signal is transmitted by beamforming. Therefore, it is difficult to apply the above scheme to a precoding matrix for forming a sharp beam.

Signal Flow for Beamforming

A signal flow for beamforming will be described with reference to FIG. 4 and FIG. 5.

Figure 4:
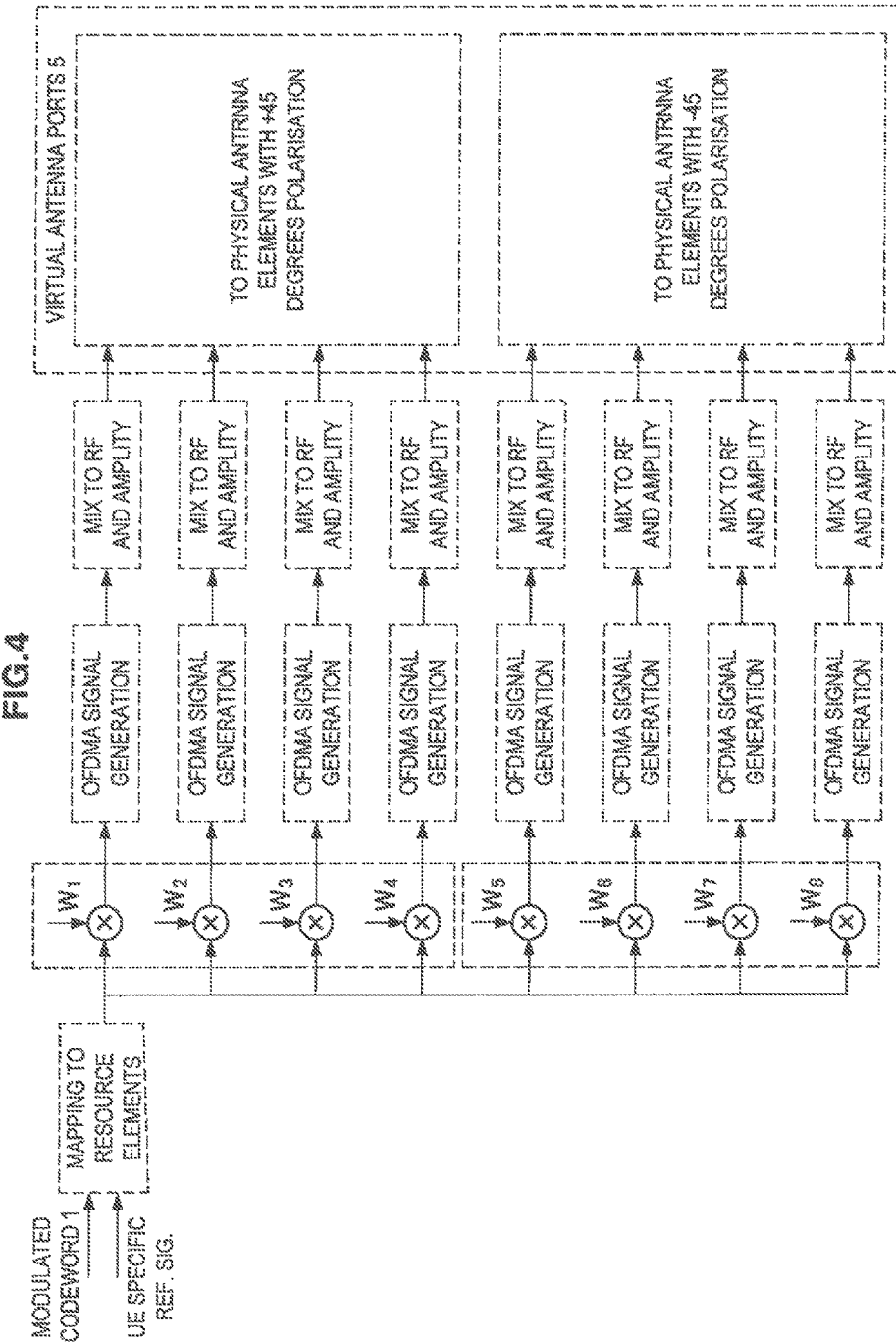
FIG. 4 is an illustrative diagram for describing an example of a signal flow for single-layer beamforming.

FIG. 4 is an illustrative diagram for describing an example of a signal flow for single-layer beamforming. Referring to FIG. 4, a modulated codeword and user equipment (UE)-specific reference signal are mapped to resource elements, and are transmitted by eight antenna elements. Thereafter, the codeword and the reference signal are multiplied by a weight coefficient $W_i$ (i=1-8) for each antenna element before being transmitted. Such weight coefficient multiplication forms a beam.

Figure 5:
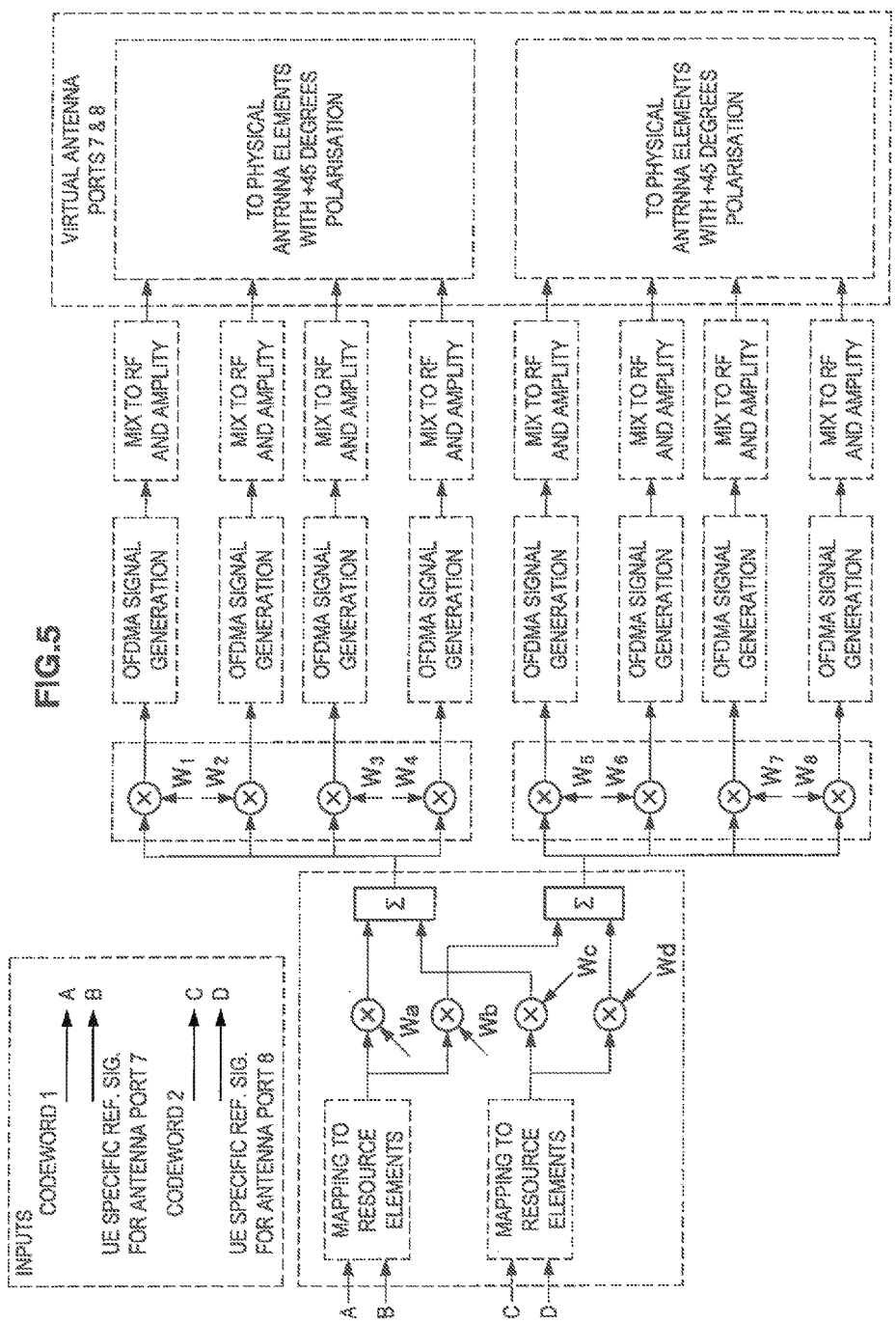
FIG. 5 is an illustrative diagram for describing an example of a signal flow for dual-layer beamforming.

FIG. 5 is an illustrative diagram for describing an example of a signal flow for dual-layer beamforming. Referring to FIG. 5, dual-layer beamforming has a precoding stage for dual-layer transmission (first stage) and a precoding stage for beamforming (second stage). More specifically, initially, multiplication by weight coefficients $W_a$, $W_b$, $W_c$, and $W_d$ is performed for dual-layer transmission, and thereafter, multiplication by weight coefficients $W_i$ (i=1-8) is performed for beamforming. Such weight coefficient multiplication allows for both dual-layer transmission and beam formation.

(Problem with Beamforming)

As described above, recent advances in antenna mounting technology may allow a base station to have a larger number of antenna elements (e.g., about 100 antenna elements). Such a large number of antenna elements are expected to allow for formation of a sharp beam. Moreover, a beam aimed in a desired three-dimensional direction can be formed by providing antenna elements on a plane.

However, an increase in the number of antenna elements possessed by a base station may be accompanied by an increase in load involved in beamforming. As an example, an increase in the number of antenna elements is accompanied by an increase in the number of weight coefficients, which in turn increases a process for calculating the set of weight coefficients. In other words, load increases in terms of a process performed by a terminal apparatus or a base station. As another example, an increase in the number of antenna elements is accompanied by an increase in the size of a codebook, and therefore, it is necessary to allocate more radio resources for notification of a recommended set of weight coefficients, resulting in an increase in overhead. In other words, load increases in terms of radio resources. As still another example, an increase in the number of antenna elements is accompanied by an increase in the number of reference signals, and therefore, it is necessary to allocate more radio resources for transmission of reference signals, resulting in an increase in overhead. In other words, load increases in terms of radio resources.

With the above in mind, embodiments of the present disclosure are provided to allow for a reduction in load involved in beamforming.

2. Schematic Configuration of Communication System

Figure 6:
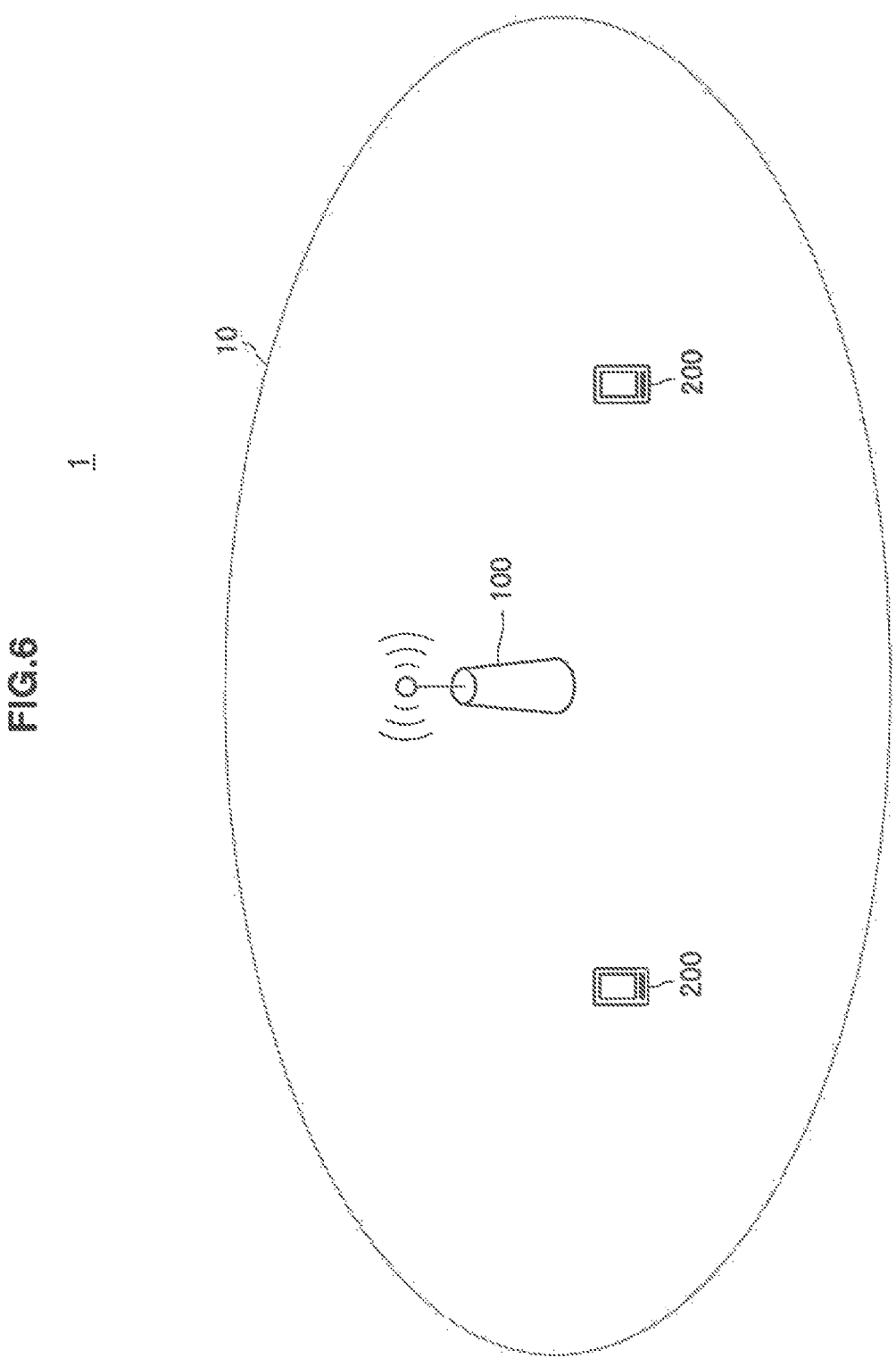
FIG. 6 is an illustrative diagram showing an example of a schematic configuration of a communication system according to an embodiment of the present disclosure.

Next, a schematic configuration of a communication system 1 according to an embodiment of the present disclosure will be described with reference to FIG. 6 to FIG. 8. FIG. 6 is an illustrative diagram showing an example of a schematic configuration of the communication system 1 according to an embodiment of the present disclosure. Referring to FIG. 6, the communication system 1 includes a base station 100 and terminal apparatuses 200.

The base station 100 wirelessly communicates with a terminal apparatus 200. For example, the base station 100 wirelessly communicates with a terminal apparatuses 200 that is located in a cell 10. In other words, a terminal apparatus 200, when located in the cell 10, wirelessly communicates with the base station 100.

Particularly in the embodiment of the present disclosure, the base station 100 includes a directional antenna capable of forming a beam aimed in a three-dimensional direction (hereinafter referred to as a "three-dimensional beam"), and transmits a signal in a three-dimensional beam. For example, the base station 100 determines a set of weight coefficients for a three-dimensional beam for each terminal apparatus 200, and transmits a signal toward the terminal apparatus 200 in a three-dimensional beam using the determined set of weight coefficients. Thereafter, the terminal apparatuses 200 receive the signals transmitted in three-dimensional beams. An example of a three-dimensional beam formed by the base station 100, and an example of transmission and reception of a signal in a three-dimensional beam, will now be described with reference to FIG. 7 and FIG. 8.

Figure 7:
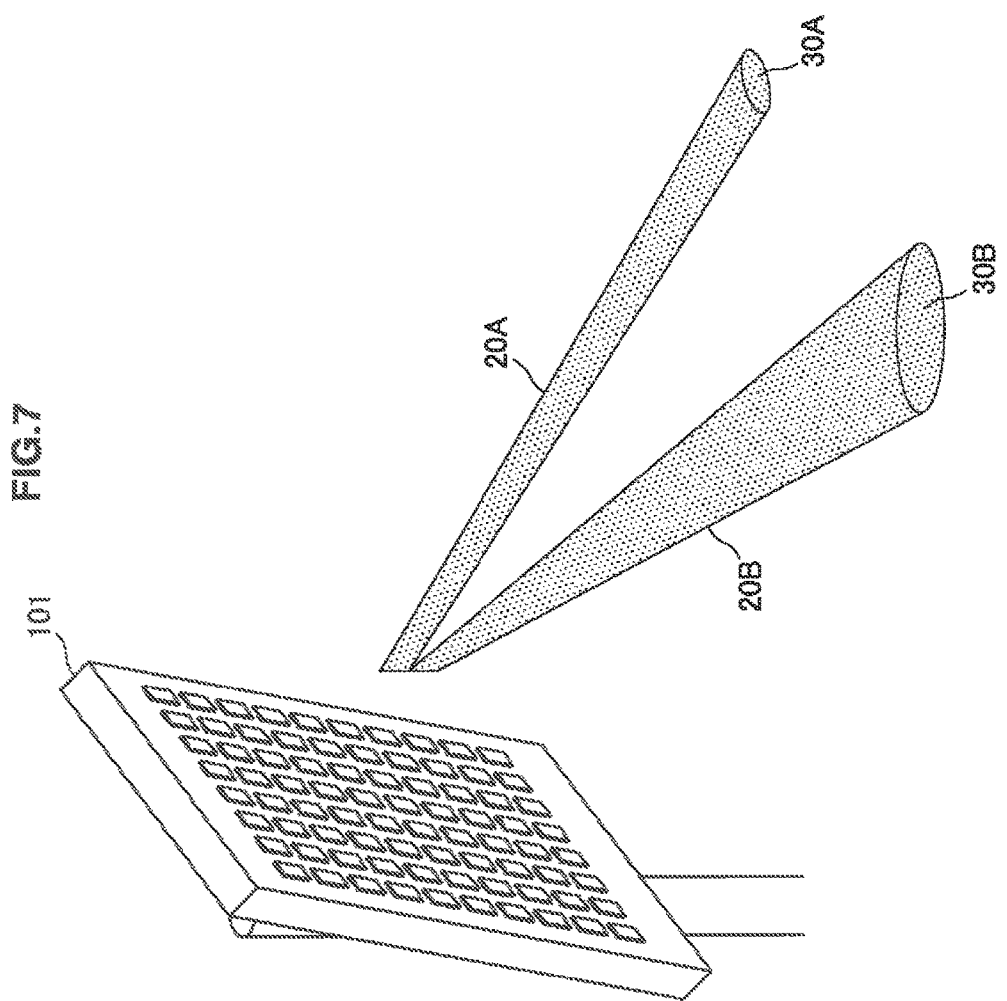
FIG. 7 is an illustrative diagram for describing an example of a three-dimensional beam formed by a base station.

FIG. 7 is an illustrative diagram for describing an example of a three-dimensional beam formed by the base station 100. Referring to FIG. 7, a directional antenna 101 is shown. The directional antenna 101 can be used to form a three-dimensional beam. As shown in FIG. 7, the directional antenna 101 is used to form a plurality of three-dimensional beams 20 aimed in different three-dimensional directions. For example, as shown, the directional antenna 101 is located at a high position to radiate the three-dimensional beams 20 downward. In this case, a communication region 30 corresponding to each three-dimensional beam 20 is generated. Specifically, a three-dimensional beam 20A is formed, and a communication region 30A corresponding to the three-dimensional beam 20A is generated. Also, a three-dimensional beam 20B is formed, and a communication region 30B corresponding to the three-dimensional beam 20B is generated.

Figure 8:
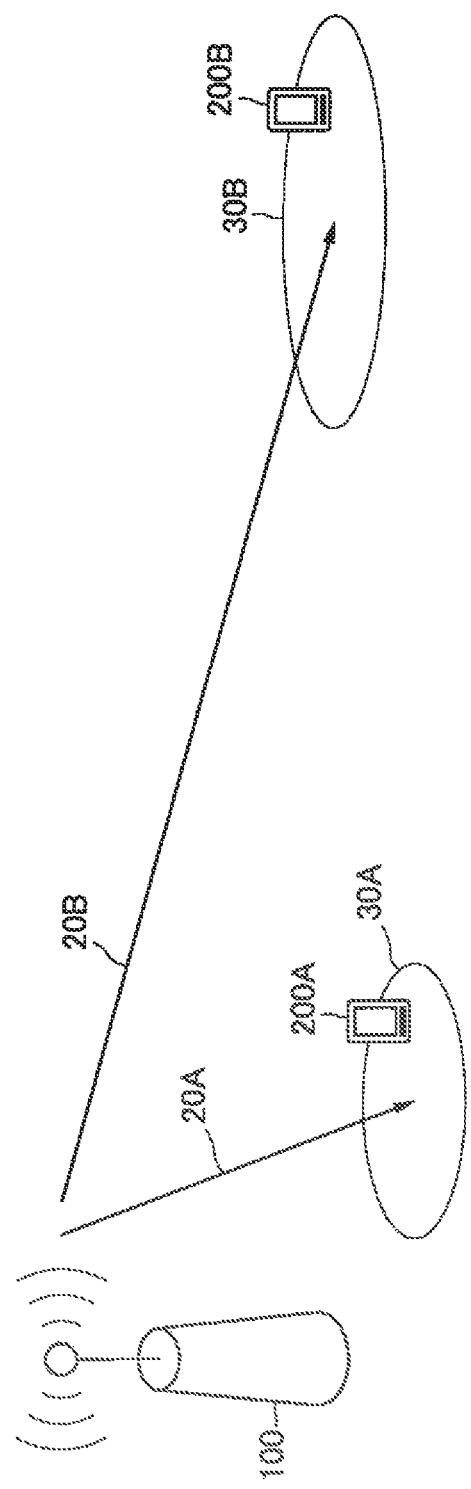
FIG. 8 is an illustrative diagram for describing an example of transmission and reception of a signal in a three-dimensional beam.

FIG. 8 is an illustrative diagram for describing an example of transmission and reception of a signal in a three-dimensional beam. Referring to FIG. 8, shown are a base station 100, and a terminal apparatus 200A and a terminal apparatus 200B. Moreover, shown are a three-dimensional beam 20A formed by the base station 100, a communication region 30A corresponding to the three-dimensional beam 20A, a three-dimensional beam 20B formed by the base station 100, and a communication region 30B corresponding to the three-dimensional beam 20B. The three-dimensional beam 20A carries a signal to the communication region 30A. In other words, the terminal apparatus 200A can receive, in the communication region 30A, a signal transmitted by the base station 100 in the three-dimensional beam 20A. Also, the three-dimensional beam 20B carries a signal to the communication region 30B. In other words, the terminal apparatus 200B can receive, in the communication region 30B, a signal transmitted by the base station 100 in the three-dimensional beam 20B. Note that the signal intensity of a signal transmitted in the three-dimensional beam 20A is high in the communication region 30A while the signal intensity is negligibly small in the communication region 30B. Also, the signal intensity of a signal transmitted in the three-dimensional beam 20B is high in the communication region 30B while the signal intensity is negligibly small in the communication region 30A.

Note that, moreover, the base station 100 may transmit a signal in a non-directional fashion. Alternatively, the base station 100 may form a sector beam, and transmit a signal in the sector beam.

3. Configuration of Each Communication Node

Next, configurations of the base station 100 and the terminal apparatus 200 according to an embodiment of the present disclosure will be described with reference to FIG. 9 to FIG. 14.

3.1. Configuration of Base Station

Figure 9:
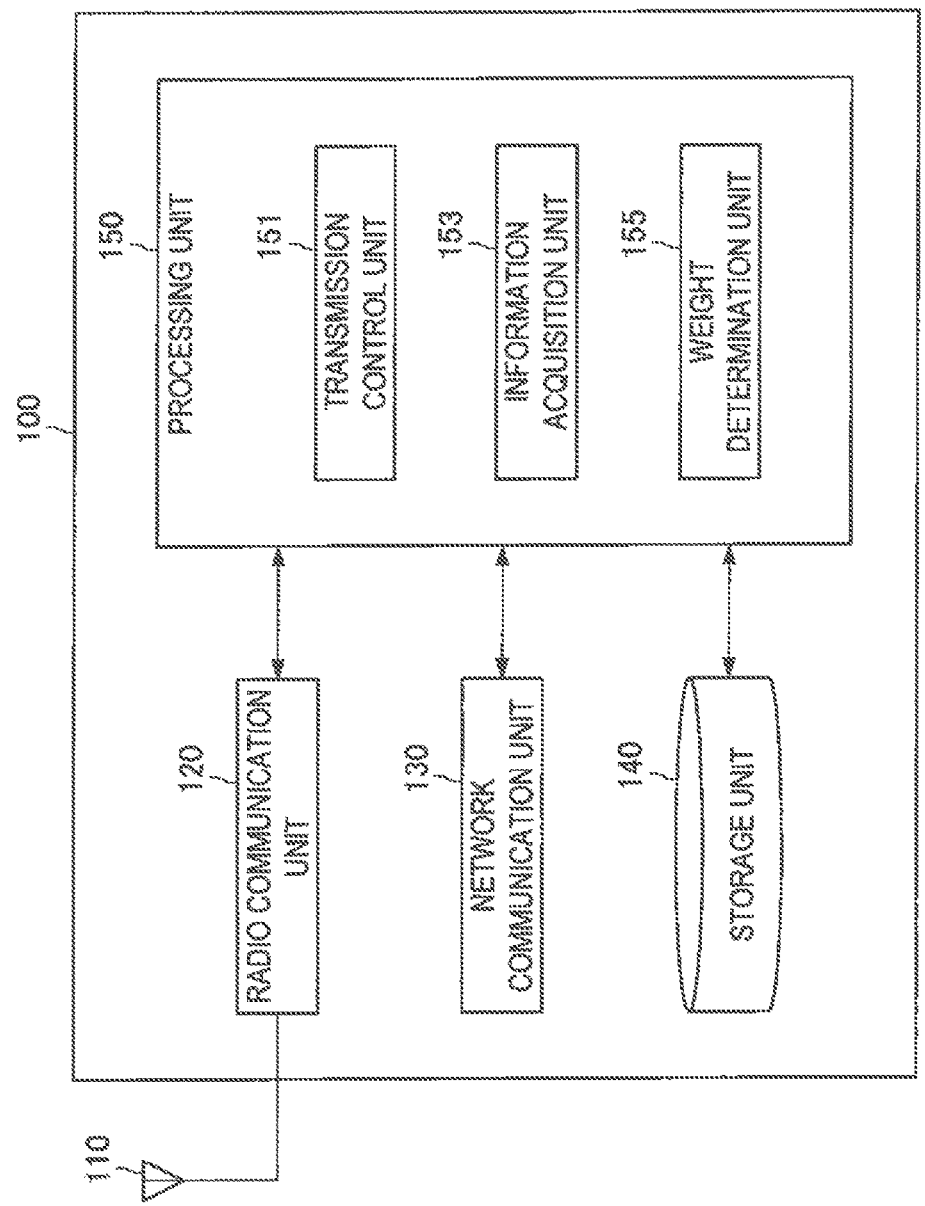
FIG. 9 is a block diagram showing an example of a configuration of a base station according to an embodiment of the present disclosure.

Firstly, an example of a configuration of the base station 100 according to an embodiment of the present disclosure will be described with reference to FIG. 9 to FIG. 13. FIG. 9 is a block diagram showing an example of a configuration of the base station 100 according to an embodiment of the present disclosure. Referring to FIG. 9, the base station 100 includes an antenna unit 110, a radio communication unit 120, a network communication unit 130, a storage unit 140, and a processing unit 150.

(Antenna Unit 110)

The antenna unit 110 radiates a signal output by the radio communication unit 120, in the form of radio waves, into space. The antenna unit 110 also converts radio waves in space into a signal, and outputs the signal to the radio communication unit 120.

Particularly in the embodiment of the present disclosure, the antenna unit 110 is used to form a three-dimensional beam aimed in a three-dimensional direction, and transmit a signal in the three-dimensional beam. For example, the antenna unit 110 is used to form a plurality of three-dimensional beams aimed in different three-dimensional directions.

The three-dimensional direction of a three-dimensional beam formed by the antenna unit 110 is determined on the basis of a set of weight coefficients corresponding to the antenna elements. For example, the processing unit 150 (transmission control unit 151) multiplies a signal by a weight coefficient for each antenna element. As a result, the antenna unit 110 forms a three-dimensional beam aimed in a three-dimensional direction that is determined on the basis of the weight coefficients.

Note that, moreover, the antenna unit 110 may transmit a signal in a non-directional fashion. The antenna unit 110 may also form a sector beam, and transmit a signal in the sector beam.

The antenna unit 110 includes, for example, a directional antenna 101 that can be used to form a beam aimed in a three-dimensional direction. The antenna unit 110 may further include a non-directional antenna or a sector antenna.

(Wireless Communication Unit 120)

The radio communication unit 120 performs wireless communication. For example, the radio communication unit 120 transmits a downlink signal to a terminal apparatus 200 located in a cell 10, and receives an uplink signal from a terminal apparatus 200 located in the cell 10.

(Network Communication Unit 130)

The network communication unit 130 communicates with other communication nodes. For example, the network communication unit 130 communicates with another base station 100 or a core network node.

(Storage Unit 140)

The storage unit 140 stores a program and data for operation of the base station 100.

(Processing Unit 150)

The processing unit 150 provides various functions of the base station 100. The processing unit 150 includes a transmission control unit 151, an information acquisition unit 153, and a weight determination unit 155.

(Transmission Control Unit 151)

The transmission control unit 151 controls transmission performed by the base station 100.

Transmission of Reference Signal by Each Antenna Group

For example, the transmission control unit 151 controls transmission of a reference signal performed by each of two or more antenna groups each including a portion of a plurality of antenna elements included in the directional antenna 101 capable of forming a three-dimensional beam.

The above two or more antenna groups include a first antenna group including at least two antenna elements arranged in, for example, a first direction, and a second antenna group including at least two antenna elements arranged in a second direction different from the first direction. Also, the above plurality of antenna elements are, for example, arranged along a plane parallel to the first direction and the second direction.

Moreover, for example, the first direction and the second direction are orthogonal to each other. The second direction is, for example, parallel to the horizontal plane.

Accordingly, as an example, by the control of the transmission control unit 151, the base station 100 transmits a reference signal using the first antenna group including at least two antenna elements arranged in the first direction that is the vertical direction (or substantially the vertical direction). Also, by the control of the transmission control unit 151, the base station 100 transmits a reference signal using the second antenna group including at least two antenna elements arranged in the second direction that is the horizontal direction. A specific example of this will now be described with reference to FIG. 10 and FIG. 11.

Figure 10:
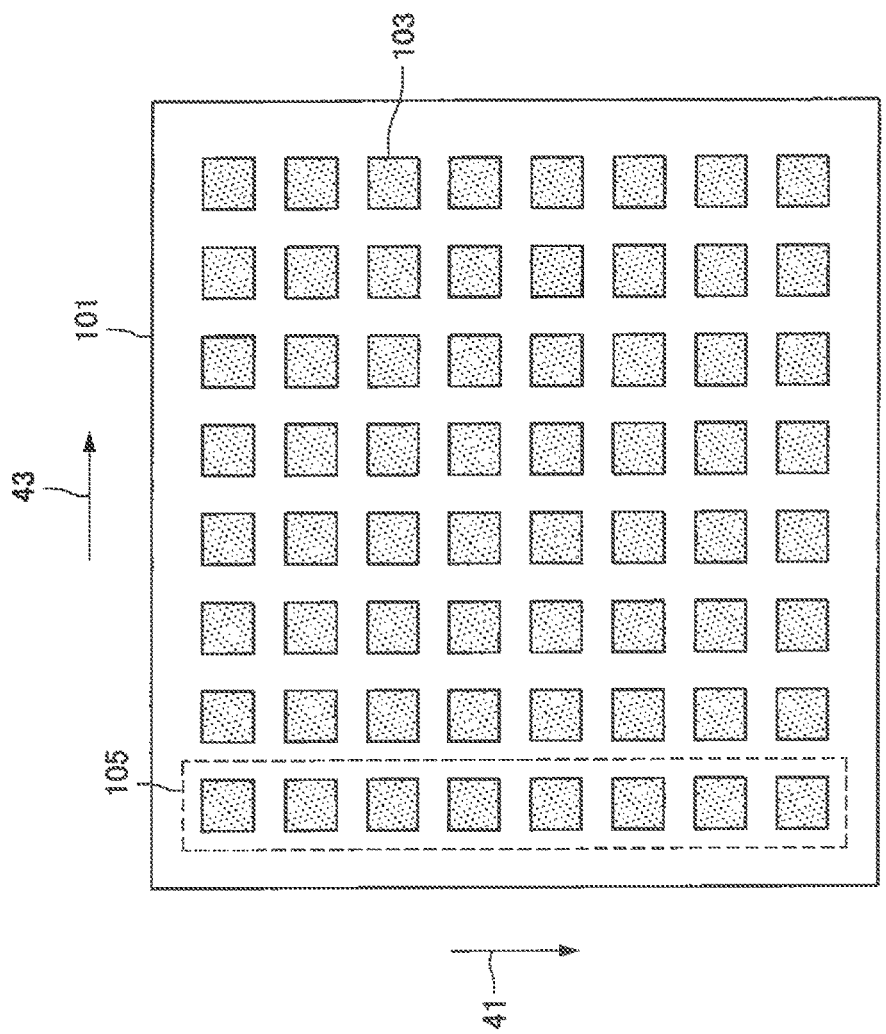
FIG. 10 is an illustrative diagram for describing an example of a first antenna group.

FIG. 10 is an illustrative diagram for describing an example of the first antenna group. Referring to FIG. 10, the directional antenna 101 is shown. The directional antenna 101 includes a plurality of antenna elements 103. More specifically, in this example, in the directional antenna 101, eight antenna elements 103 are arranged in a first direction 41 that is the vertical direction (or substantially the vertical direction), and eight antenna elements 103 are arranged in a second direction 43 that is the horizontal direction. In other words, in the directional antenna 101, 64 antenna elements 103 are arranged on a plane parallel to the first direction 41 and the second direction 43. In addition, for example, a first antenna group 105 includes 8 antenna elements arranged in the first direction 41 of the 64 antenna elements 103 included in the directional antenna 101. By the control of the transmission control unit 151, the base station 100 transmits a reference signal using the first antenna group 105.

Figure 11:
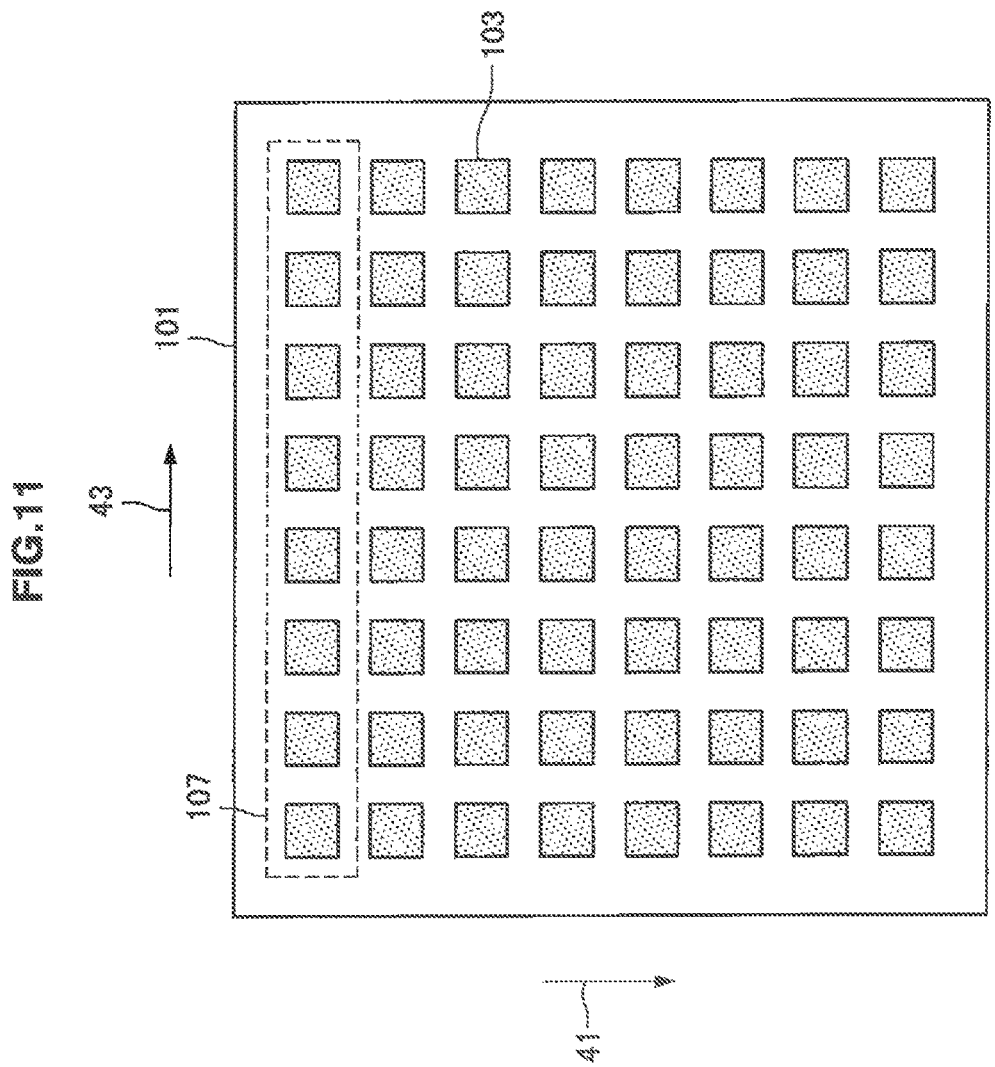
FIG. 11 is an illustrative diagram for describing an example of a second antenna group.

FIG. 11 is an illustrative diagram for describing an example of the second antenna group. Referring to FIG. 11, as in FIG. 10, the directional antenna 101 and the 64 antenna elements 103 are shown. For example, a first antenna group 107 includes 8 antenna elements arranged in the second direction 43 of the 64 antenna element 103 included in the directional antenna 101. By the control of the transmission control unit 151, the base station 100 transmits a reference signal using the second antenna group 107.

For example, as described above, the base station 100 transmits a reference signal using each antenna group. As a result, for example, a terminal apparatus 200 can estimate channel characteristics on the basis of reception of a reference signal transmitted by each antenna group. In addition, a terminal apparatus 200 can calculate a set of weight coefficients that is used by each antenna group to form a beam aimed at the terminal apparatus 200, on the basis of the estimated channel characteristics.

Note that, for example, each of the two or more antenna groups (e.g., the first antenna group and the second antenna group) transmits a reference signal without multiplication by a set of weight coefficients. In other words, each of the two or more antenna groups transmits a reference signal in a non-directional beam.

Also, for example, the transmission control unit 151 controls transmission of a reference signal by performing mapping of reference signals to resource elements, generation of a signal that is to be transmitted by each antenna element, or the like.

Radio Resources Used in Transmission of Reference Signal

For example, the transmission control unit 151 controls transmission of a reference signal that is performed by each of the two or more antenna groups so that the two or more antenna groups transmit a reference signal in different resource blocks. For example, the transmission control unit 151 controls transmission of a reference signal so that the first antenna group and the second antenna group transmit a reference signal in different resource blocks.

As a specific example, the transmission control unit 151 controls transmission of a reference signal that is performed by each of the two or more antenna groups so that the two or more antenna groups transmit a reference signal in resource blocks having different times within a frequency band having at least any band width. For example, by the control of the transmission control unit 151, the first antenna group and the second antenna group transmit a reference signal in resource blocks of different sub-frames within a frequency band corresponding to one resource block (a band having 12 subcarriers).

Moreover, as a specific example, the transmission control unit 151 controls transmission of a reference signal that is performed by each of the two or more antenna groups so that the two or more antenna groups transmit a reference signal in resource blocks having different frequency bands within at least any time. For example, by the control of the transmission control unit 151, the first antenna group and the second antenna group transmit a reference signal in resource blocks having different frequency bands (of different 12 subcarriers) within the same sub-frame.

Accordingly, as an example, by the control of the transmission control unit 151, the first antenna group and the second antenna group transmit a reference signal in alternate sub-frames that come at predetermined intervals, within a frequency band corresponding to one resource block. Also, by the control of the transmission control unit 151, the first antenna group and the second antenna group transmit a reference signal in alternate resource blocks arranged in the frequency direction, within one sub-frame transmitted. A specific example of this will now be described with reference to FIG. 12.

Figure 12:
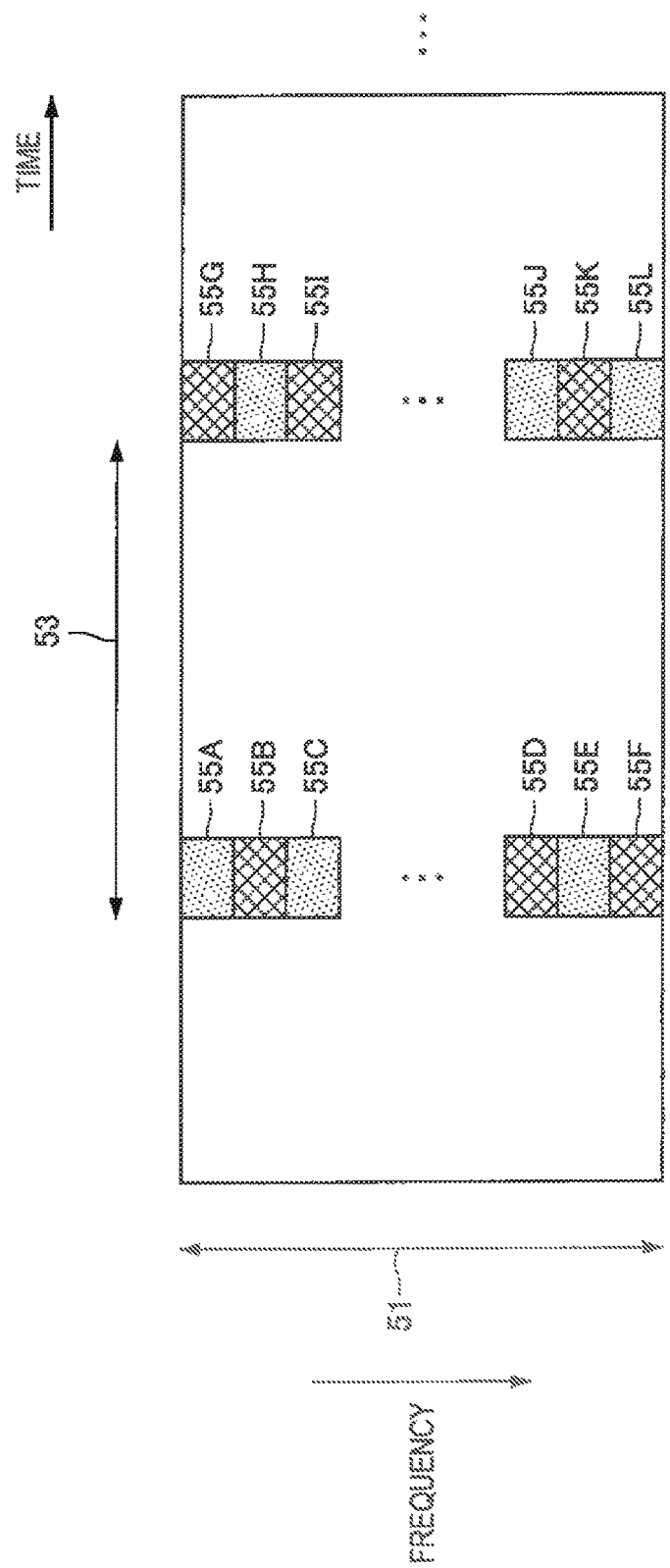
FIG. 12 is an illustrative diagram for describing an example of resource blocks in which a first antenna group and a second antenna group transmit a reference signal.

FIG. 12 is an illustrative diagram for describing an example of resource blocks in which the first antenna group and the second antenna group transmit a reference signal. Referring to FIG. 12, shown are radio resources of a component carrier 51. The first antenna group transmits a reference signal in resource blocks 55A, 55C, 55E, 55H, 55J, 55L, and the like. The second antenna group transmits a reference signal in resource blocks 55B, 55D, 55F, 55G, 55I, 55K, and the like.

Firstly, within a frequency band corresponding to one resource block, the first antenna group and the second antenna group transmit a reference signal in alternate sub-frames that come at predetermined intervals 53. For example, the first antenna group transmits a reference signal in the resource block 55A, and the second antenna group transmits a reference signal in the resource block 55G the predetermined interval 53 after the resource block 55A. Also, the second antenna group transmits a reference signal in the resource block 55D, and the first antenna group transmits a reference signal in the resource block 55J the predetermined interval 53 after the resource block 55D.

Secondly, within one sub-frame, the first antenna group and the second antenna group transmit a reference signal in alternate resource blocks arranged in the frequency direction. For example, within a certain sub-frame, the first antenna group transmits a reference signal in the resource blocks 55A, 55C, 55E, and the like, and the second antenna group transmits a reference signal in the resource blocks 55B, 55D, 55F, and the like. Also, within another sub-frame, the first antenna group transmits a reference signal in the resource blocks 55H, 55J, 55L, and the like, and the second antenna group transmits a reference signal in the resource blocks 55G, 55I, 55K, and the like.

As described above, the two or more antenna groups transmit a reference signal in different resource blocks. An example of reference signals transmitted in resource blocks will now be described with reference to FIG. 13.

Figure 13:
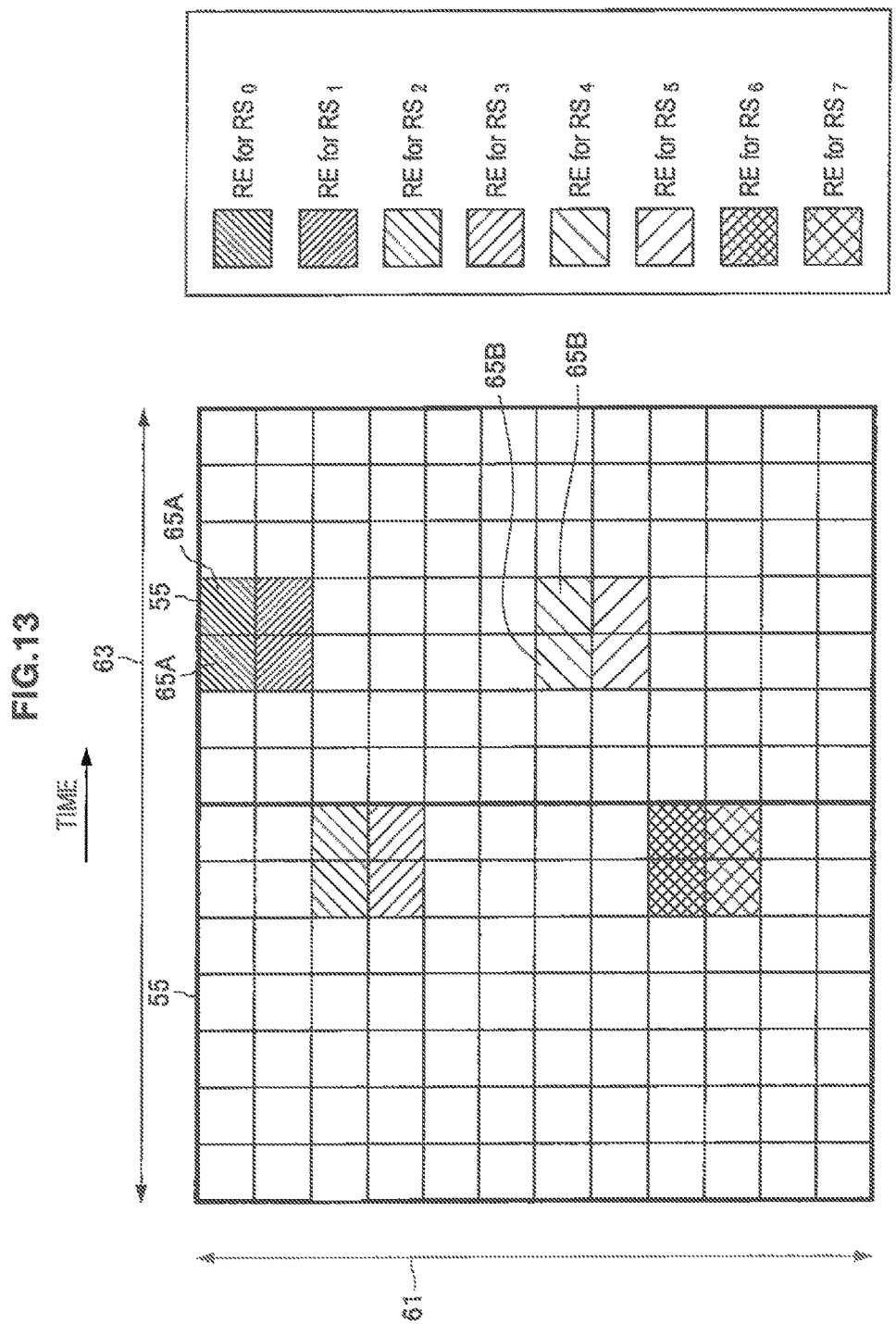
FIG. 13 is an illustrative diagram for describing an example of reference signals transmitted in resource blocks.

FIG. 13 is an illustrative diagram for describing an example of reference signals transmitted in resource blocks. Referring to FIG. 13, two resource blocks 55 are shown. The two resource blocks 55 are located in a band 61 of 12 sub-frames in the frequency direction, and in a sub-frame 63 in the time direction. As described above, for example, the first antenna group and the second antenna group each include eight antenna elements, and transmit eight reference signals $RS_0$-$RS_7$. More specifically, for example, the first antenna element included in an antenna group (the first antenna group or the second antenna group) transmits the reference signal $RS_0$ in a corresponding resource element 65A. Also, the fifth antenna element included in an antenna group transmits the reference signals $RS_4$ in a corresponding resource element 65B.

As described above, the two or more antenna groups (e.g., the first antenna group and the second antenna group) each transmit a reference signal in different resource blocks. As a result, for example, the amount of radio resources used for transmission of reference signals by the two or more antenna groups can be reduced. Also, the types of reference signals transmitted by the two or more antenna groups can be reduced. Thus, for example, load can be reduced in terms of radio resources.

Also, as described above, for example, a reference signal is transmitted in resource blocks having different times within a frequency band having any band width. As a result, for example, a terminal apparatus 200 can estimate a channel in the same frequency band or a close frequency band for two or more antenna groups.

Also, as described above, for example, a reference signal is transmitted in resource blocks having different frequency bands within any time. As a result, for example, a terminal apparatus 200 can estimate a channel quickly without waiting, for any of two or more antenna groups.

Note that, for example, the base station 100 notifies a terminal apparatus 200 of information relating to a reference signal for beamforming. The information contains, for example, a signal sequence transmitted as a reference signal, a predetermined interval during which a reference signal is transmitted, the offset of a sub-frame, and the like. For example, the transmission control unit 151 notifies a terminal apparatus 200 of the information through the radio communication unit 120. As an example, when the mode of a terminal apparatus 200 is switched from the radio resource control (RRC) idle mode to the RRC connection mode, the terminal apparatus 200 is notified of the information.

Transmission Using Three-Dimensional Beam

For example, the transmission control unit 151 controls transmission of a signal to a terminal apparatus 200 that is performed by the plurality of antenna elements included in the directional antenna 101.

As described below, for example, the weight determination unit 155 determines a set of weight coefficients for the plurality of antenna elements that are used to form a three-dimensional beam aimed at a terminal apparatus 200. Thereafter, the transmission control unit 151 uses the determined set of weight coefficients to control transmission of a signal to the terminal apparatus 200 in a three-dimensional beam. Specifically, a signal to the terminal apparatus 200 is multiplied by the determined set of weight coefficients, and as a result, the signal to the terminal apparatus 200 is transmitted in a three-dimensional beam aimed at the terminal apparatus 200.

Note that, as an example, the transmission control unit 151 controls transmission of a signal to a terminal apparatus 200 by mapping signals to resource elements, multiplying by weight coefficients for each antenna element, generating a signal that is to be transmitted to each antenna element, or the like.

(Information Acquisition Unit 153)

The information acquisition unit 153 acquires a set of weight coefficients for forming a beam aimed at a terminal apparatus 200, for each of two or more antenna groups each including a portion of the plurality of antenna elements included in the directional antenna 101 capable of forming a three-dimensional beam.

Specifically, for example, the information acquisition unit 153 acquires the above set of weight coefficients for forming a beam aimed at a terminal apparatus 200, for the first antenna group. The information acquisition unit 153 also acquires the above set of weight coefficients for forming a beam aimed at the terminal apparatus 200, for the second antenna group.

Acquisition of Recommended Set of Weight Coefficients

For example, the information acquisition unit 153 acquires a recommended set of weight coefficients notified by a terminal apparatus 200, as the above set of the weight coefficients.

Specifically, for example, a terminal apparatus 200 estimates channel characteristics on the basis of reception of a reference signal transmitted by each antenna group. Thereafter, the terminal apparatus 200 determines a recommended set of weight coefficients for forming a beam aimed at the terminal apparatus 200, on the basis of the estimated channel characteristics, for each antenna group, and notifies the base station 100 of the recommended set. As a result, the information acquisition unit 153 acquires the recommended set.

As a result, for example, the base station 100 can acquire a set of weight coefficients for forming a beam aimed at a terminal apparatus 200, for each antenna group.

The notification of the recommended set is, for example, notification of an index indicating one of a plurality of candidate recommended sets of weight coefficients. Specifically, a terminal apparatus 200 notifies of an index indicating a recommended set determined of a plurality of candidate recommended sets, thereby notifying of the recommended set determined. The notification of such an index allows for a reduction in overhead, for example.

As a specific example, the plurality of candidate recommended sets are a set of weight coefficients contained in a codebook. Also, the above index is a codebook index in the codebook. For example, the same codebook is stored in the base station 100 (the storage unit 140) and the terminal apparatuses 200. A terminal apparatus 200 notifies of a codebook index to notify of a recommended set of weight coefficients. The base station 100 uses a codebook to acquire a recommended set of weight coefficients on the basis of a codebook index. Note that the codebook index may also be referred to as, for example, a PMI. The base station 100 may be notified of the codebook index as a portion (PMI) of channel state information (CSI).

Also, the notification of the recommended set for an antenna group is, for example, performed in a sub-frame that is the fourth sub-frame after a sub-frame in which the reference signal has been transmitted by the antenna group.

(Weight Determination Unit 155)

The weight determination unit 155 determines a set of weight coefficients for the plurality of antenna elements that is used to forming a three-dimensional beam aimed at a terminal apparatus 200, on the basis of the above sets of the weight coefficients for the two or more antenna groups.

As described above, for example, the information acquisition unit 153 acquires a set of weight coefficients for forming a beam aimed at a terminal apparatus 200 for each of the first antenna group and the second antenna group. Thereafter, the weight determination unit 155 determines a set of weight coefficients for forming a three-dimensional beam aimed at the terminal apparatus 200, for the plurality of antenna elements, on the basis of the set of the set of the weight coefficients for the first antenna group and the set of the weight coefficients for the second antenna group.

Referring back to FIG. 10 and FIG. 11, as an example, the first antenna group 105 and the second antenna group 107 each include eight antenna elements 103. The weight determination unit 155 determines a set of weight coefficients for the 64 antenna elements 103, on the basis of a set of weight coefficients for the first antenna group 105 and a set of weight coefficients for the second antenna group 107.

As a specific technique, for example, the weight determination unit 155 determines the set of the weight coefficients for the plurality of antenna elements, through multiplication of a matrix indicating a set of weight coefficients for the first antenna group by a matrix indicating a set of weight coefficients for the second antenna group.

As an example, as shown in FIG. 10 and FIG. 11, the first antenna group 105 includes antenna elements arranged in a first direction 41 (i.e., the vertical direction), and the second antenna group 107 includes antenna elements arranged in a second direction 43 (i.e., the horizontal direction). In the directional antenna 101, M (e.g., eight) antenna elements are arranged in the first direction, and N (e.g., eight) antenna elements are arranged in the second direction. A precoding matrix $W_y$ for the first antenna group 105 and a precoding matrix $W_x$ for the second antenna group 107 are acquired. In this case, a weight coefficient $W_{i,j}$ for an antenna element that is located at an i-th position in the first direction and a j-th position in the second direction is, for example, calculated as follows.

$$W = \begin{bmatrix} W_{0,0} & W_{1,0} & \cdots & W_{M,0} \\ W_{0,1} & W_{1,1} & \cdots & W_{M,1} \\ \vdots & \vdots & \ddots & \vdots \\ W_{0,N} & W_{1,N} & \cdots & W_{M,N} \end{bmatrix} = \begin{bmatrix} Wy_0 \\ Wy_1 \\ \vdots \\ Wy_N \end{bmatrix} \cdot \begin{bmatrix} Wx_0 \\ Wx_1 \\ \vdots \\ Wx_M \end{bmatrix}^T \quad \text{[Math 3]}$$

For example, a set of weight coefficients $W_{i,j}$ thus calculated is determined as a set of weight coefficients for the plurality of antenna elements (e.g., 64 antenna elements) that is used to form a three-dimensional beam aimed at a terminal apparatus 200. Note that the technique of calculating and determining the set of the weight coefficients for the plurality of antenna elements is not limited to the above example. For example, various calculation and determination techniques may be applicable, depending on an assumption, such as the arrangement of antenna elements, the settings of antenna groups, the number of antenna groups, or the like.

As described above, a set of weight coefficients for the plurality of antenna elements that is used to form a three-dimensional beam aimed at a terminal apparatus 200, is determined. As a result, load involved in beamforming can be reduced. As an example, instead of directly calculating a set of weight coefficients for a large number of antenna elements, it is only necessary to calculate a set of weight coefficients for a smaller number of antenna elements, for each antenna group. Therefore, the load of the process of calculating a set of weight coefficients can be reduced. Also, as another example, instead of notifying of codebook indices for a set of weight coefficients for a large number of antenna elements, it is only necessary to notify of a combination of codebook indices for a set of weight coefficients for a smaller number of antenna elements. Therefore, overhead for notification can be reduced. Also, as still another example, instead of transmitting a reference signal using a large number of antenna elements, it is only necessary to transmit a reference signal using a smaller number of antenna elements, for each antenna group. Therefore, overhead for transmission of a reference signal can be reduced. For example, thus, load involved in beamforming can be reduced in terms of processing, radio resources, or the like.

3.2. Configuration of Terminal Apparatus

Figure 14:
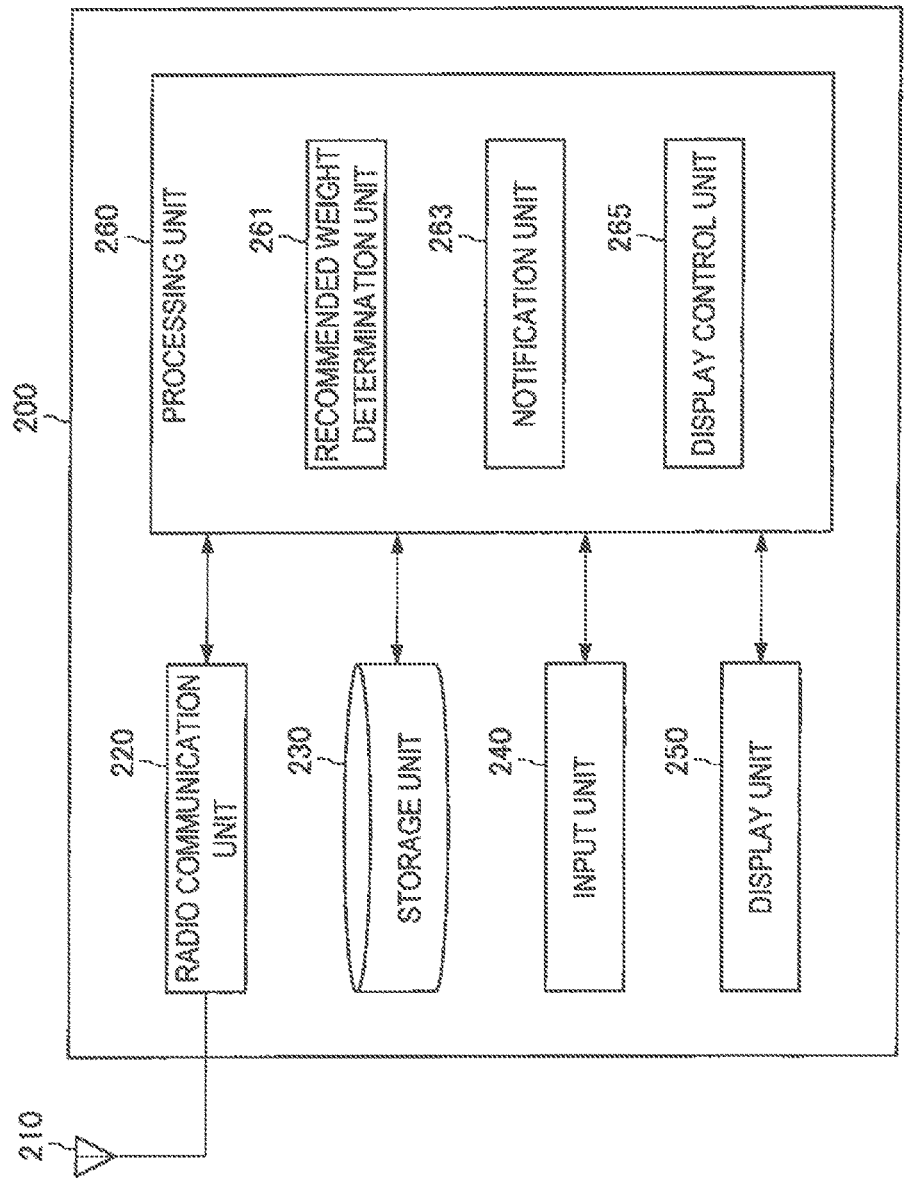
FIG. 14 is a block diagram showing an example of a configuration of a terminal apparatus according to an embodiment of the present disclosure.

Next, an example of a configuration of the terminal apparatus 200 according to an embodiment of the present disclosure will be described with reference to FIG. 14. FIG. 14 is a block diagram showing an example of a configuration of the terminal apparatus 200 according to an embodiment of the present disclosure. Referring to FIG. 14, the terminal apparatus 200 includes an antenna unit 210, a radio communication unit 220, a storage unit 230, an input unit 240, a display unit 250, and a processing unit 260.

(Antenna Unit 210)

The antenna unit 210 radiates a signal output by the radio communication unit 220, in the form of radio waves, into space. The antenna unit 210 also converts radio waves in space into a signal, and outputs the signal to the radio communication unit 220.

(Wireless Communication Unit 220)

The radio communication unit 220 performs wireless communication. For example, when the terminal apparatus 200 is located in a cell 10, the radio communication unit 220 receives a downlink signal from the base station 100, and transmits an uplink signal to the base station 100.

(Storage Unit 230)

The storage unit 230 stores a program and data for operation of the terminal apparatus 200.

(Input Unit 240)

The input unit 240 receives an input entered by the user of the terminal apparatus 200. The input unit 240 provides the input result to the processing unit 260.

(Display Unit 250)

The display unit 250 displays a screen that is presented to the user of the terminal apparatus 200. For example, the display unit 250 displays the screen by the control of the processing unit 260 (display control unit 265).

(Processing Unit 260)

The processing unit 260 provides various functions of the terminal apparatus 200. The processing unit 260 includes an estimated weight determination unit 261, a notification unit 263, and a display control unit 265.

(Estimated Weight Determination Unit 261)

The estimated weight determination unit 261 determines a set of weight coefficients. For example, the estimated weight determination unit 261 determines a recommended set of weight coefficients.

For example, the estimated weight determination unit 261 determines a recommended set of weight coefficients for forming a beam aimed at the terminal apparatus 200, for each of the two or more antenna groups, on the basis of reception of a reference signal transmitted by each of the two or more antenna groups.

Specifically, for example, the estimated weight determination unit 261 estimates channel characteristics (e.g., a channel matrix) on the basis of reception of a reference signal transmitted by each antenna group (e.g., each of the first antenna group and the second antenna group). Thereafter, the estimated weight determination unit 261 determines a recommended set of weight coefficients for forming a beam aimed at the terminal apparatus 200, on the basis of the estimated channel characteristics, for each antenna group.

As an example, the estimated weight determination unit 261 calculates an optimum precoding matrix (i.e., a set of weight coefficients) that maximizes the SINR, on the basis of the estimated channel matrix. Thereafter, the estimated weight determination unit 261 selects a precoding matrix that is closet to the optimum precoding matrix, from precoding matrices contained in a codebook, and determines the selected precoding matrix as a recommended precoding (i.e., a recommended set of weight coefficients).

Note that the estimated weight determination unit 261 may select a precoding matrix having a smallest distance metric with respect to an optimum precoding matrix, from precoding matrices contained in a codebook, as a precoding matrix that is closest to the optimum precoding matrix. For example, a distance metric $D_L$ between an L-th precoding matrix $W_L$ and an optimum precoding matrix V in a codebook is represented using an (i, j)-th component $V_{i,j}$ of the optimum precoding matrix V, and an (i, j)-th component $W_{L, i, j}$ of the precoding matrix $W_L$, as follows.

$$D_L = \sum_{i,j} |V_{i,j} - W_{L,i,j}|^2 \qquad \text{[Math 4]}$$

For example, as described above, a recommended set of weight coefficients is determined for each of the two or more antenna groups.

(Notification Unit 263)

The notification unit 263 notifies the base station 100 of information.

For example, the notification unit 263 notifies of the recommended set for each of the two or more antenna groups. For example, as described above, the estimated weight determination unit 261 determines a recommended set of weight coefficients for forming a beam aimed at the terminal apparatus 200, for each of the two or more antenna groups. Thereafter, the notification unit 263 notifies the base station 100 of the recommended set thus determined, through the radio communication unit 220.

For example, as described above, the notification unit 263 notifies of the recommended set determined, by notifying of an index indicating the recommended set determined, of a plurality of candidate recommended sets. By notification of such an index, overhead can be reduced, for example.

As a specific example, as described above, the plurality of candidate recommended sets are a set of weight coefficients contained in a codebook. Also, the above index is a codebook index in the codebook. For example, the same codebook is stored in the base station 100 and the terminal apparatus 200 (the storage unit 230). The terminal apparatus 200 notifies of the recommended set determined, by notifying of a codebook index indicating the recommended set determined. Note that the codebook index may also be referred to as, for example, a PMI. The notification unit 263 notifies of the codebook index as a portion (PMI) of CSI.

Note that, as described above, the above recommended sets for the two or more antenna groups are information that is used to determine a set of weight coefficients for the plurality of antenna elements that is used to form a three-dimensional beam aimed at the terminal apparatus 200.

(Display Control Unit 265)

The display control unit 265 controls display of an output screen that is performed by the display unit 250. For example, the display control unit 265 generates an output screen that is displayed by the display unit 250, and causes the display unit 250 to display the output screen.

4. Flow of Process

Next, an example of a communication control process according to an embodiment of the present disclosure will be described with reference to FIG. 15 and FIG. 16.

(Flow of Entire Process)

Figure 15:
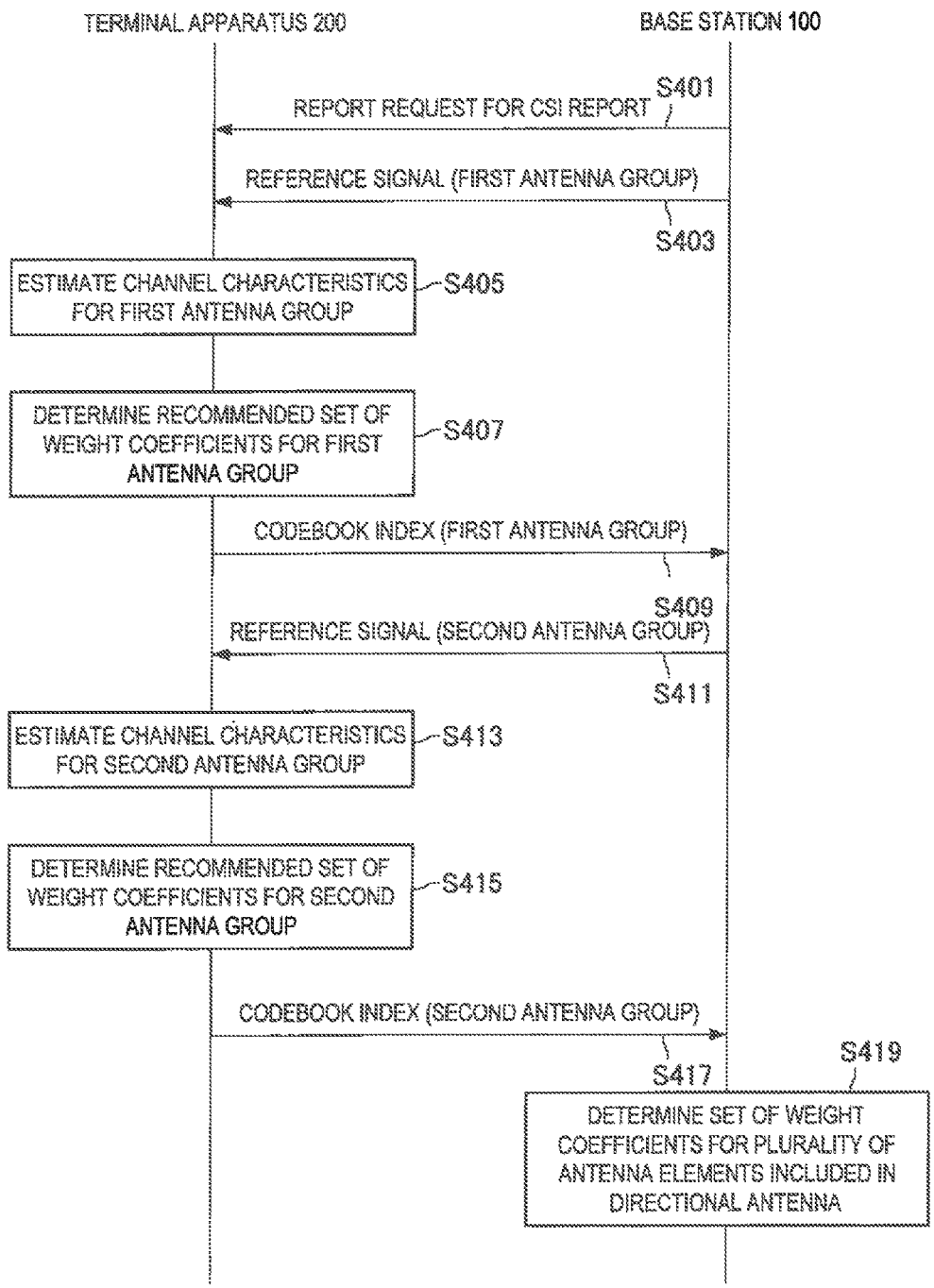
FIG. 15 is a sequence diagram showing an example of a schematic flow of an entire communication control process according to an embodiment of the present disclosure.

FIG. 15 is a sequence diagram showing an example of a schematic flow of an entire communication control process according to an embodiment of the present disclosure.

Initially, the base station 100 performs report request for a CSI report (S401).

Thereafter, the base station 100 transmits a reference signal using the first antenna group (S403).

Thereafter, the terminal apparatus 200 estimates channel characteristics (channel matrix) for the first antenna group (S405). Thereafter, the terminal apparatus 200 determines a recommended set of weight coefficients for the first antenna group on the basis of the estimated channel characteristics (S407). The recommended set thus determined is a set of weight coefficients that is used by the first antenna group to form a beam aimed at the terminal apparatus 200.

Thereafter, the terminal apparatus 200 notifies the base station 100 of a codebook index (a codebook index for the first antenna group) indicating the recommended set determined (S409). For example, the terminal apparatus 200 notifies of the codebook index in a sub-frame that is the fourth sub-frame after a sub-frame in which the reference signal has been transmitted.

Also, the base station 100 transmits a reference signal using the second antenna group (S411).

Thereafter, the terminal apparatus 200 estimates channel characteristics (channel matrix) for the second antenna group (S413). Thereafter, the terminal apparatus 200 determines a recommended set of weight coefficients for the second antenna group on the basis of the estimated channel characteristics (S415). The recommended set thus determined is a set of weight coefficients that is used by the second antenna group to form a beam aimed at the terminal apparatus 200.

Thereafter, the terminal apparatus 200 notifies the base station 100 of a codebook index (a codebook index for a second antenna group) indicating the recommended set determined (S417). For example, the terminal apparatus 200 notifies of the codebook index in a sub-frame that is the fourth sub-frame after a sub-frame in which the reference signal has been transmitted.

Thereafter, the base station 100 determines a set of weight coefficients for the plurality of antenna elements included in the directional antenna 101, on the basis of the recommended set of weight coefficients for the first antenna group and the recommended set of weight coefficients for the second antenna group (S419). The determined set of weight coefficients is a set of weight coefficients that is used by the plurality of antenna elements to form a three-dimensional beam aimed at the terminal apparatus 200.

Note that, of course, steps S403-S409 and steps S411-S417 may be switched, or all or a portion thereof may overlap, in the time direction.

(Communication Control Process in Base Station)

Figure 16:
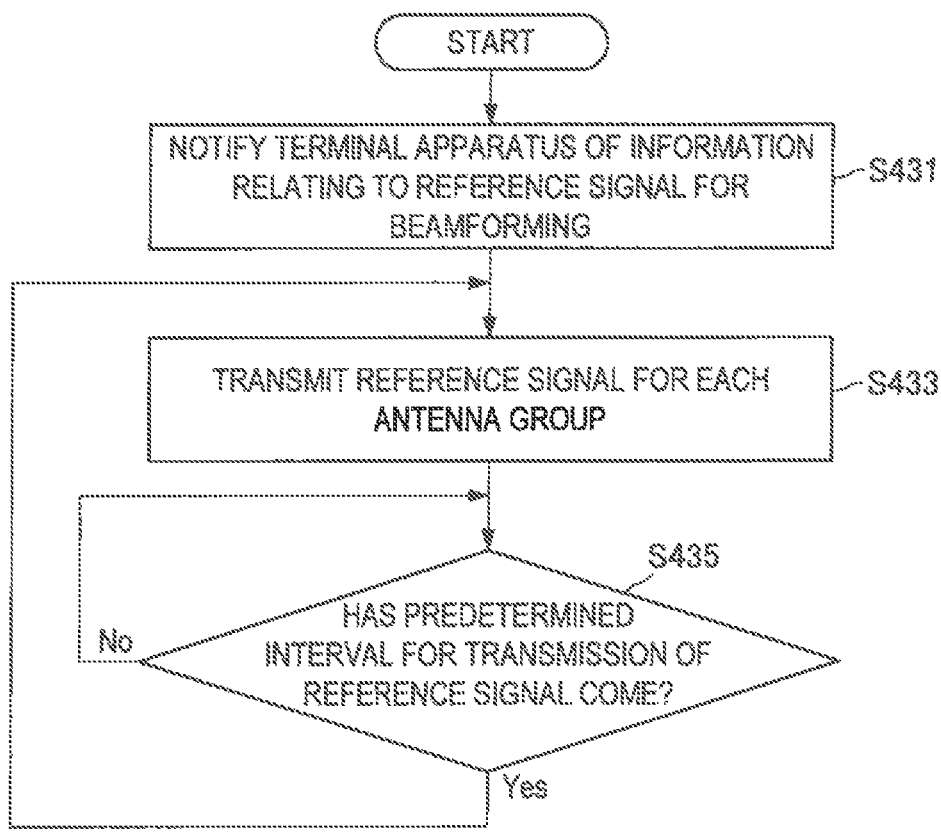
FIG. 16 is a flowchart showing an example of a schematic flow of a communication control process in a base station according to an embodiment of the present disclosure.

FIG. 16 is a flowchart showing an example of a schematic flow of a communication control process in a base station according to an embodiment of the present disclosure. The communication control process is involved in transmission of a reference signal.

Initially, the base station 100 (the transmission control unit 151) notifies a terminal apparatus 200 of information relating to a reference signal for beamforming (S431).

The base station 100 transmits a reference signal for each antenna group by the control of the transmission control unit 151 (S433). Thereafter, when a predetermined interval for transmission of a reference signal comes (S435: Yes), a reference signal is transmitted again (S433). Such transmission of a reference signal is repeatedly performed at predetermined intervals.

5. Variations

Next, first to fourth variations of the embodiment of the present disclosure will be described with reference to FIG. 17 to FIG. 22.

5.1. First Variation

Firstly, a first variation of the embodiment of the present disclosure will be described with reference to FIG. 17.

(Overview)

In the above example of the embodiment, the base station 100 transmits a reference signal using each of the two or more antenna groups. Thereafter, the base station 100 acquires a recommended set of weight coefficients notified by the terminal apparatus 200, as the above set of weight coefficients for forming a beam aimed at a terminal apparatus 200, for each antenna group. In other words, in the above example of the embodiment, the scheme of using precoding based on a codebook is employed.

Meanwhile, according to the first variation, the base station 100 acquires a set of weight coefficients calculated on the basis of reception of a reference signal transmitted by a terminal apparatus 200, as the set of weight coefficients for forming a beam aimed at the terminal apparatus 200, for each antenna group. In other words, in the first variation, the scheme of using precoding not based on a codebook is employed.

(Base Station 100: Transmission Control Unit 151)

Transmission of Reference Signal for Each Antenna Group

In the first variation, the transmission control unit 151 may not control transmission of a reference signal that is performed by each of the two or more antenna groups, or may not control the transmission. In other words, the base station 100 may transmit a reference signal using each of the two or more antenna groups, or may not transmit the reference signal.

(Base Station 100: Information Acquisition Unit 153)

Acquisition of Recommended Set of Weight Coefficients

Particularly in the first variation, the information acquisition unit 153 acquires a set of weight coefficients calculated on the basis of reception of a reference signal transmitted by a terminal apparatus 200, as a set of weight coefficients for forming a beam aimed at a terminal apparatus 200.

Specifically, for example, a terminal apparatus 200 transmits a sounding reference signal. Thereafter, the base station 100 (the information acquisition unit 153) estimates channel characteristics on the basis of reception of a sounding reference signal by each of the two or more antenna groups (e.g., the first antenna group and the second antenna group). Thereafter, the base station 100 (the information acquisition unit 153) calculates an optimum set of weight coefficients (i.e., an optimum precoding matrix) that, for example, maximizes the SIRN, on the basis of the estimated channel characteristics, for each of the two or more antenna groups. The information acquisition unit 153 acquires the optimum set of weight coefficients thus calculated, as a set of weight coefficients for forming a beam aimed at the terminal apparatus 200, for each antenna group. Thus, in the first variation, the scheme of using precoding not based on a codebook may also be employed.

As a result, for example, the base station 100 can acquire a set of weight coefficients for forming a beam aimed at a terminal apparatus 200, for each antenna group.

Note that, also in the first variation, a terminal apparatus 200 may notify of a recommended set of weight coefficients. Thereafter, the information acquisition unit 153 may acquire the recommended set notified, as the above set of weight coefficients. In other words, the scheme of using precoding based on a codebook may also be employed. Alternatively, in the first variation, a recommended set of weight coefficients may not be notified by a terminal apparatus 200. In this case, the information acquisition unit 153 may not acquire the recommended set notified, as the above set of weight coefficients.

(Terminal Apparatus 200: Recommended Weight Determination Unit 261 and Notification Unit 263)

Also in the first variation, the estimated weight determination unit 261 may determine a recommended set of weight coefficients for forming a beam aimed at a terminal apparatus 200, for each of the two or more antenna groups, and the notification unit 263 may notify of the recommended set. Alternatively, in the first variation, the estimated weight determination unit 261 may not determine a recommended set of weight coefficients for forming a beam aimed at a terminal apparatus 200, and the notification unit 263 may not notify of the recommended set, for each of the two or more antenna groups.

(Flow of Process)

Figure 17:
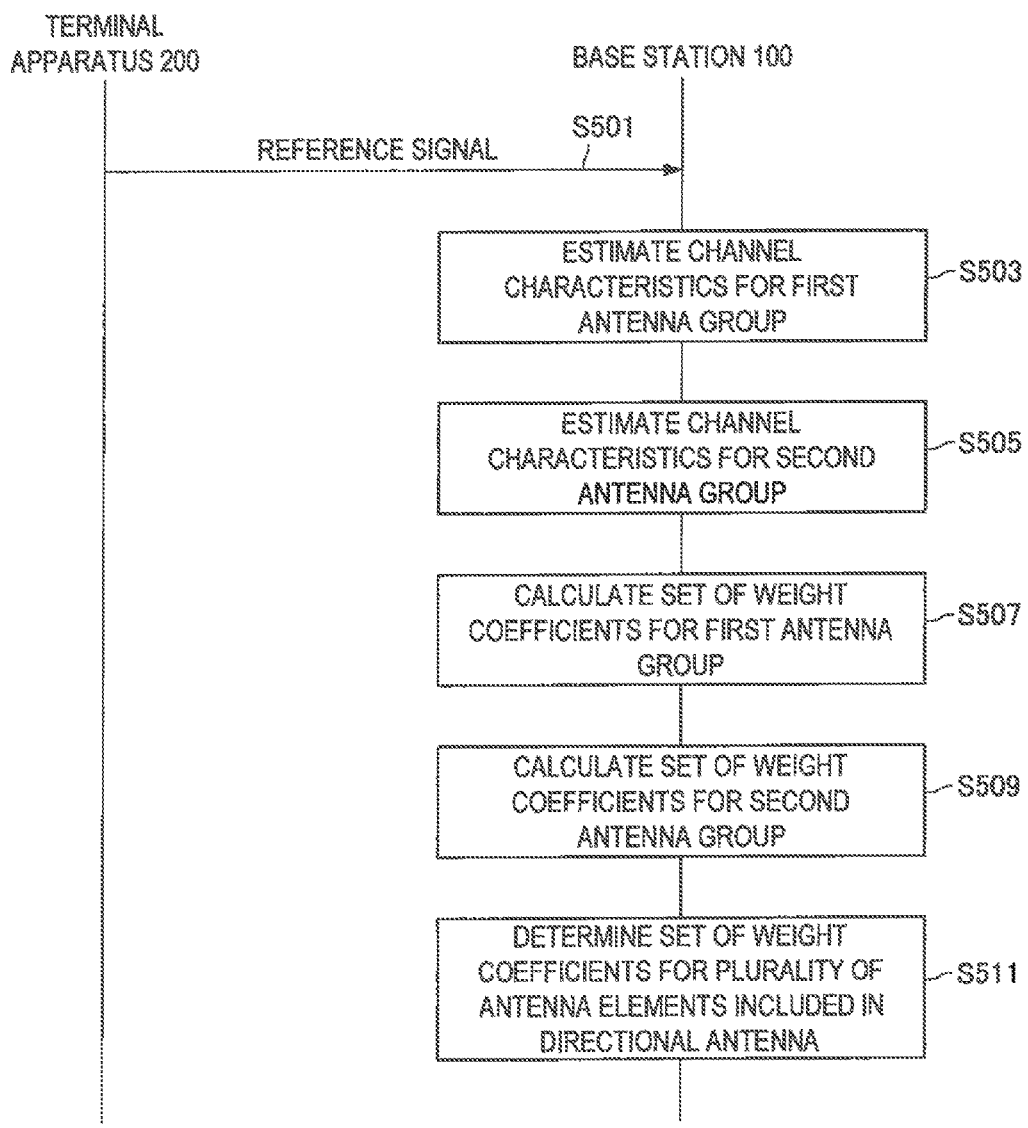
FIG. 17 is a sequence diagram showing an example of a schematic flow of an entire communication control process according to a first variation.

FIG. 17 is a sequence diagram showing an example of a schematic flow of an entire communication control process according to the first variation.

A terminal apparatus 200 transmits a reference signal (sounding reference signal) (S501).

Thereafter, the base station 100 estimates channel characteristics (channel matrix) for the first antenna group (S503). The base station 100 also estimates channel characteristics (channel matrix) for the second antenna group (S505).

Moreover, the base station 100 calculates a set of weight coefficients for the first antenna group, on the basis of the channel characteristics estimated for the first antenna group (S507). The base station 100 calculates a set of weight coefficients for the second antenna group, on the basis of the channel characteristics estimated for the second antenna group (S509). The calculated sets of weight coefficients are each a set of weight coefficients for forming a beam aimed at the terminal apparatus 200.

Thereafter, the base station 100 determines a set of weight coefficients for the plurality of antenna elements included in the directional antenna 101, on the basis of the above set of weight coefficients for the first antenna group and the above set of weight coefficients for the second antenna group (S511). The determined set of weight coefficients is a set of weight coefficients for forming a three-dimensional beam aimed at the terminal apparatus 200 using the plurality of antenna elements.

5.2. Second Variation

Next, a second variation of the embodiment of the present disclosure will be described with reference to FIG. 18.

(Overview)

In the above example of the embodiment, the base station 100 determines a set of weight coefficients for the plurality of antenna elements that is used to form a three-dimensional beam aimed at a terminal apparatus 200, on the basis of the above sets of the weight coefficients for the two or more antenna groups.

Meanwhile, according to the second variation, a terminal apparatus 200 determines a set of weight coefficients for the plurality of antenna elements that is used to form a three-dimensional beam aimed at the terminal apparatus 200, on the basis of the above sets of the weight coefficients for the two or more antenna groups.

(Terminal Apparatus 200: Estimated Weight Determination Unit 261)

The estimated weight determination unit 261 determines a set of weight coefficients. For example, the estimated weight determination unit 261 determines a recommended set of weight coefficients.

Particularly in the second variation, the estimated weight determination unit 261 acquires a set of weight coefficients for forming a beam aimed at a terminal apparatus 200, for each of the two or more antenna groups. Thereafter, the estimated weight determination unit 261 determines a set of weight coefficients for the plurality of antenna elements that is used to form a three-dimensional beam aimed at the terminal apparatus 200, on the basis of the above sets of the weight coefficients for the two or more antenna groups. For example, the estimated weight determination unit 261 determines the set of weight coefficients as a recommended set of weight coefficients.

More specifically, for example, the estimated weight determination unit 261 estimates channel characteristics (e.g., a channel matrix) on the basis of reception of a reference signal transmitted by each of the two or more antenna groups (e.g., the first antenna group and the second antenna group). Thereafter, the estimated weight determination unit 261 calculates a set of weight coefficients for forming a beam aimed at a terminal apparatus 200, on the basis of the estimated channel characteristics, for each of the two or more antenna groups. Moreover, the estimated weight determination unit 261 determines a set of weight coefficients for the plurality of antenna elements that is used to form a three-dimensional beam aimed at the terminal apparatus 200, on the basis of the above sets of the weight coefficients for the two or more antenna groups. For example, the estimated weight determination unit 261 determines the set of the weight coefficients as a recommended set of weight coefficients.

(Terminal Apparatus 200: Notification Unit 263)

Particularly in the second variation, the notification unit 263 notifies of a recommended set of weight coefficients for the plurality of antenna elements that is used to form a three-dimensional beam aimed at a terminal apparatus 200. For example, the notification unit 263 notifies of the set of the weight coefficients for the plurality of antenna elements by notifying of an index (codebook index) indicating the recommended set.

(Base Station 100: Information Acquisition Unit 153)

Particularly in the second variation, the information acquisition unit 153 acquires a set of weight coefficients for the plurality of antenna elements that is used to form a three-dimensional beam aimed at a terminal apparatus 200.

For example, a terminal apparatus 200 notifies the base station 100 of a recommended set of weight coefficients for the plurality of antenna elements that is used to form a three-dimensional beam aimed at the terminal apparatus 200. Thereafter, the information acquisition unit 153 acquires the recommended set.

Note that the information acquisition unit 153 may not acquire a set of weight coefficients for forming a beam aimed at a terminal apparatus 200, for each of the two or more antenna groups.

(Base Station 100: Weight Determination Unit 155)

The weight determination unit 155 finally determines a set of weight coefficients for the plurality of antenna elements that is used to form a three-dimensional beam aimed at a terminal apparatus 200.

For example, the weight determination unit 155 finally determines a recommended set of weight coefficients acquired by the information acquisition unit 153, as the set of weight coefficients for the plurality of antenna elements. Note that the weight determination unit 155 may finally determine another set of weight coefficients different from the recommended set, as the set of the weight coefficients for the plurality of antenna elements, on the basis of a recommended set of weight coefficients acquired by the information acquisition unit 153.

(Flow of Process)

Figure 18:
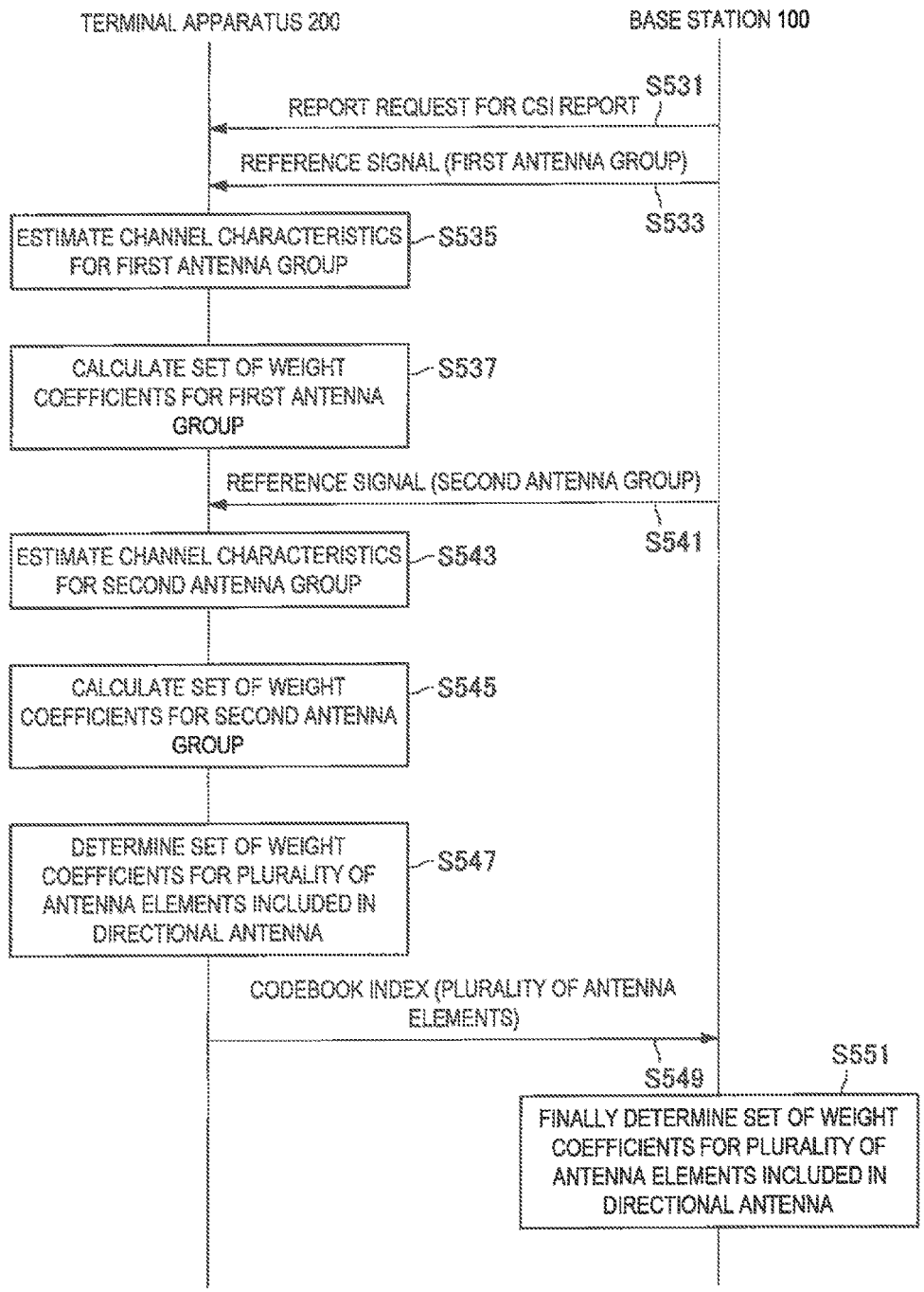
FIG. 18 is a sequence diagram showing an example of a schematic flow of an entire communication control process according to a second variation.

FIG. 18 is a sequence diagram showing an example of a schematic flow of an entire communication control process according to the second variation.

Initially, the base station 100 performs report request for a CSI report (S531).

Thereafter, the base station 100 transmits a reference signal using the first antenna group (S533).

Thereafter, a terminal apparatus 200 estimates channel characteristics (channel matrix) for the first antenna group (S535). Thereafter, the terminal apparatus 200 calculates a set of weight coefficients for the first antenna group, on the basis of the estimated channel characteristics (S537). The calculated set of weight coefficients is a set of weight coefficients that is used by the first antenna group to form a beam aimed at the terminal apparatus 200.

Also, the base station 100 transmits a reference signal using the second antenna group (S541).

Thereafter, the terminal apparatus 200 estimates channel characteristics (channel matrix) for the second antenna group (S543). Thereafter, the terminal apparatus 200 calculates a set of weight coefficients for the second antenna group, on the basis of the estimated channel characteristics (S545). The calculated set of weight coefficients is a set of weight coefficients that is used by the second antenna group to form a beam aimed at the terminal apparatus 200.

Thereafter, the terminal apparatus 200 determines a set of weight coefficients for the plurality of antenna elements included in the directional antenna 101, on the basis of the set of weight coefficients for the first antenna group and the set of weight coefficients for the second antenna group (S547). The set of the weight coefficients is determined as a recommended set of weight coefficients.

Thereafter, the terminal apparatus 200 notifies the base station 100 of a codebook index indicating the recommended set thus determined (a codebook index indicating the plurality of antenna elements included in the directional antenna 101) (S549).

Thereafter, the base station 100 finally determines a set of weight coefficients for the plurality of antenna elements included in the directional antenna 101, on the basis of the recommended set of the weight coefficients for the plurality of antenna elements (S551).

In the foregoing, the second variation has been described. Note that, in the second variation, a communication control apparatus having a technical feature according to the embodiment of the present disclosure is the terminal apparatus 200, but not the base station 100. Specifically, the terminal apparatus 200 acquires a set of weight coefficients for each of the two or more antenna groups, and determines a set of weight coefficients for the plurality of antenna elements on the basis of the set of the weight coefficients.

5.3. Third Variation

Next, a third variation of the embodiment of the present disclosure will be described with reference to FIG. 19 and FIG. 20.

(Overview)

According to the third variation, a set of weight coefficients for forming a beam aimed at a terminal apparatus 200 is changed, depending on an angle between the direction of radiation of a beam aimed at the terminal apparatus 200 and the horizontal plane, for at least one antenna group.

Specifically, the base station 100 acquires a set of weight coefficients for forming a beam having a weaker directivity, as the above set of the weight coefficients, for at least one antenna group, when the above angle is outside a predetermined angle range than when the angle is within the predetermined angle range. When the angle is outside the predetermined angle range, the base station 100 determines a set of weight coefficients for a plurality of antenna elements that is used to form a beam (a three-dimensional beam, a two-dimensional beam, or a non-directional beam).

Note that when the angle is within the predetermined angle range, the base station 100 determines a set of weight coefficients for a plurality of antenna elements that is used to form a three-dimensional beam.

(Base Station 100: Information Acquisition Unit 153)

In the third variation, the information acquisition unit 153 acquires a set of weight coefficients for forming a beam having a weaker directivity, as the above set of weight coefficients, for at least one antenna group, when an angle between the direction of radiation of a beam aimed at the terminal apparatus 200 and the horizontal plane is outside a predetermined angle range than when the angle is within the angle range.

Specifically, for example, as shown in FIG. 10, the first antenna group 105 includes the antenna elements 103 arranged in the first direction 41. The first direction 41 is the vertical direction. In such a case, for example, a terminal apparatus 200 estimates channel characteristics on the basis of reception of a reference signal transmitted by the first antenna group 105. Thereafter, the terminal apparatus 200 calculates, on the basis of the estimated channel characteristics, an angle between the direction of radiation of a beam aimed at the terminal apparatus 200 by the first antenna group 105 and the horizontal plane. For example, the angle is within a predetermined angle range (e.g., the range between −A and A). In this case, as in the above example of the embodiment, the terminal apparatus 200 determines a recommended set of weight coefficients for forming a beam aimed at the terminal apparatus 200, for each of the first antenna group 105 and the second antenna group 107. Alternatively, for example, the angle is outside the predetermined angle range. In this case, the terminal apparatus 200 determines a set of weight coefficients for forming a beam having a weaker directivity, as the above recommended set, for at least one of the first antenna group 105 and the second antenna group 107. Thereafter, the terminal apparatus 200 notifies the base station 100 of the recommended set. Thereafter the information acquisition unit 153 acquires the recommended set of weight coefficients notified by the terminal apparatus 200, as a set of weight coefficients for forming a beam aimed at the terminal apparatus 200, for each of the first antenna group 105 and the second antenna group 107. Therefore, when the angle is outside the predetermined angle range, the base station 100 acquires a set of weight coefficients for forming a beam having a weaker directivity, for at least one of the first antenna group 105 and the second antenna group 107. A specific example will now be described with reference to FIG. 19.

Figure 19:
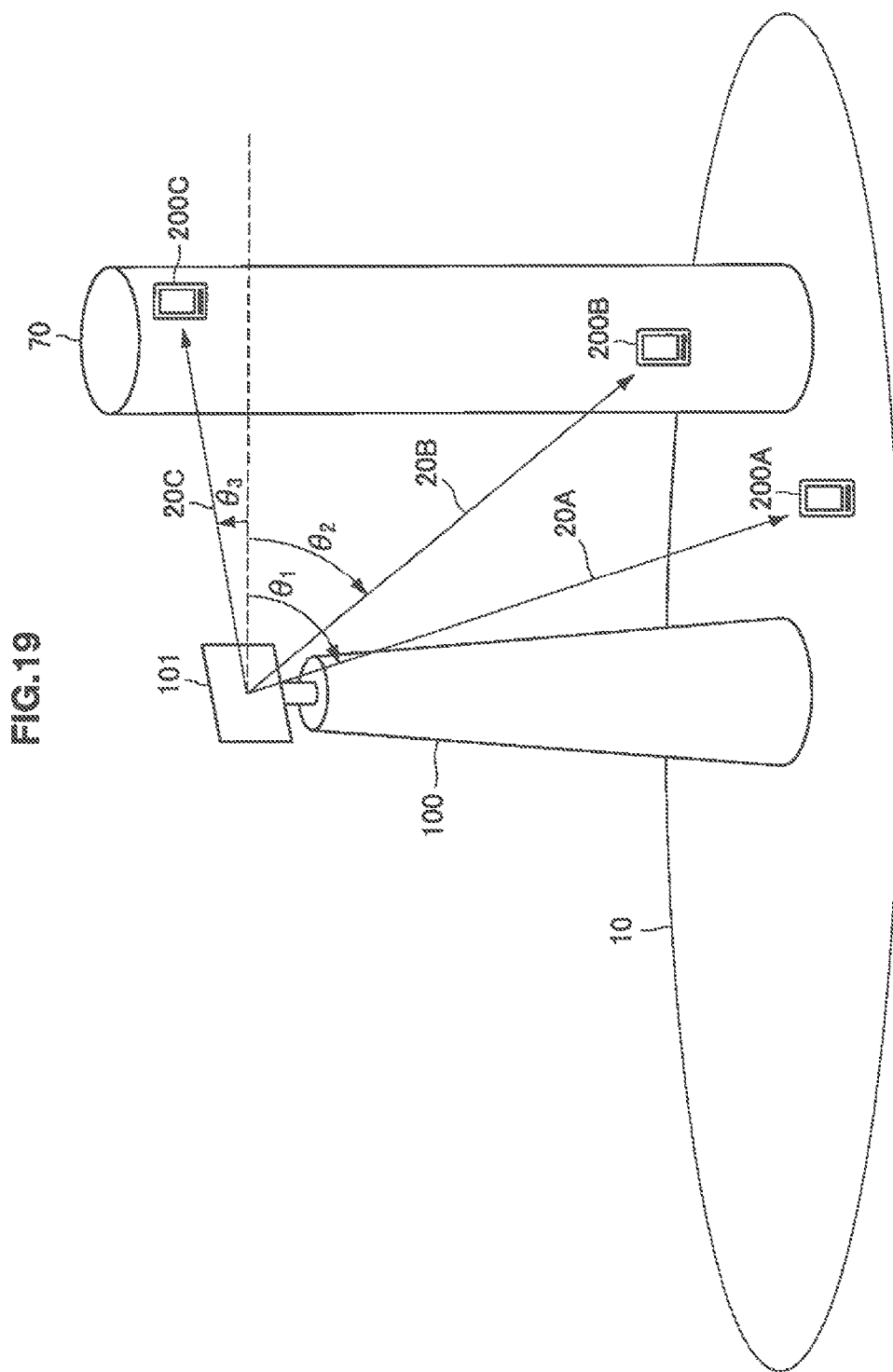
FIG. 19 is an illustrative diagram for describing an example of weight coefficients for an antenna group that are acquired, depending on an angle.

FIG. 19 is an illustrative diagram for describing an example of weight coefficients for an antenna group that are acquired, depending on the angle. Referring to FIG. 19, shown are angles theta 1, theta 2, and theta 3 between the directions of radiation of beams aimed at a terminal apparatus 200A, a terminal apparatus 200B, and a terminal apparatus 200C, respectively, and the horizontal plane. For example, theta 1 and theta 2 are outside a predetermined angle range (e.g., the range between −A and A). Therefore, for the terminal apparatus 200A and the terminal apparatus 200B, a set of weight coefficients for forming a beam having a weak directivity is acquired as a set of weight coefficients for the first antenna group. As a result, for example, for the terminal apparatus 200A and the terminal apparatus 200B, a three-dimensional beam is not formed. Meanwhile, for example, theta 3 is within the predetermined angle range. Therefore, for the terminal apparatus 200C, a set of weight coefficients for forming a beam having a strong directivity is acquired as a set of weight coefficients for the first antenna group. As a result, a three-dimensional beam is formed for the terminal apparatus 200C.

An angle theta (Greek letter) between the direction of radiation of a beam aimed at a terminal apparatus 200 by the first antenna group and the horizontal plane may be calculated using a weight coefficient $V_m$ of an m-th antenna element in the first direction 41 (vertical direction) and a space d between each antenna element in the first direction 41 (vertical direction). Specifically, for example, the weight coefficient $V_m$ is represented by the following formula using the angle theta, the space d, the frequency f, and the speed of light c. Therefore, the angle theta may be calculated using this formula, the weight coefficient $V_m$, the space d, the frequency f, and the speed of light c.

$$V_m = \exp\left(j2\pi \frac{f}{c}(m-1)d \sin\theta\right) \quad \text{[Math 5]}$$

Note that, in the above example, it is determined whether the angle between the direction of radiation of a beam aimed at a terminal apparatus 200 and the horizontal plane is within a predetermined angle range, using the angle itself. The third variation is, of course, not limited to this example. It may be determined whether the angle the direction of radiation of a beam aimed at a terminal apparatus 200 and the horizontal plane is within a predetermined angle range, on the basis of, for example, whether the angle between the direction of radiation of a beam aimed at the terminal apparatus 200 and the vertical direction is within another predetermined range. Thus, it is not necessary to determine whether the angle between the direction of radiation of a beam aimed at a terminal apparatus 200 and the horizontal plane is within a predetermined angle range, using the angle itself; and it may be determined substantially.

(Base Station 100: Weight Determination Unit 155)

For example, the angle between the direction of radiation of a beam aimed at a terminal apparatus 200 and the horizontal plane is within the above predetermined angle range. In the third variation, in this case, the weight determination unit 155 determines a set of weight coefficients for the plurality of antenna elements that is used to form a three-dimensional beam aimed at the terminal apparatus 200. In other words, when the angle is within the predetermined angle range, a set of weight coefficients for forming a three-dimensional beam is determined.

Alternatively, for example, the angle between the direction of radiation of a beam aimed at a terminal apparatus 200 and the horizontal plane is outside the predetermined angle range. In the third variation, in this case, the weight determination unit 155 determines a set of weight coefficients for the plurality of antenna elements that is used to form a beam aimed at the terminal apparatus 200. In other words, when the angle is outside the predetermined angle range, the determined set of weight coefficients is not limited to a set of weight coefficients for forming a three-dimensional beam, and may be a set of weight coefficients for forming a two-dimensional beam or a non-directional beam.

Thus, according to the third variation, a beam having a weaker directivity can be used for a terminal apparatus 200 for which it is not necessary to use a three-dimensional beam, and a three-dimensional beam can be used for a terminal apparatus 200 for which it is necessary to use a three-dimensional beam. For example, a three-dimensional beam can be used for a terminal apparatus 200 that is located at a cell edge, a terminal apparatus 200 that is assumed to be located on an upper floor of a building, or the like. As a result, in a communication system, processing load can be reduced while communication quality is improved.

(Terminal Apparatus 200: Estimated Weight Determination Unit 261)

For example, in the third variation, the estimated weight determination unit 261 determines a set of weight coefficients for forming a beam having a weaker directivity, as a recommended set of weight coefficients, for at least one antenna group, when an angle between the direction of radiation of a beam aimed at a terminal apparatus 200 and the horizontal plane is outside a predetermined angle range than when the angle is within the angle range.

As described above, for example, the estimated weight determination unit 261 estimates channel characteristics on the basis of reception of a reference signal transmitted by the first antenna group 105, and calculates, from the estimated channel characteristics, the angle between the direction of radiation of a beam aimed at a terminal apparatus 200 and the horizontal plane. For example, the angle is within a predetermined angle range. In this case, as in the above example of the embodiment, the estimated weight determination unit 261 determines a recommended set of weight coefficients for forming a beam aimed at the terminal apparatus 200, for each of the first antenna group 105 and the second antenna group 107. Alternatively, for example, the angle is outside the predetermined angle range. In this case, the estimated weight determination unit 261 determines a set of weight coefficients for forming a beam having a weaker directivity, as the recommended set, for at least one of the first antenna group and the second antenna group. Thereafter, the notification unit 263 notifies the base station 100 of the recommended set.

(Flow of Process)

Figure 20:
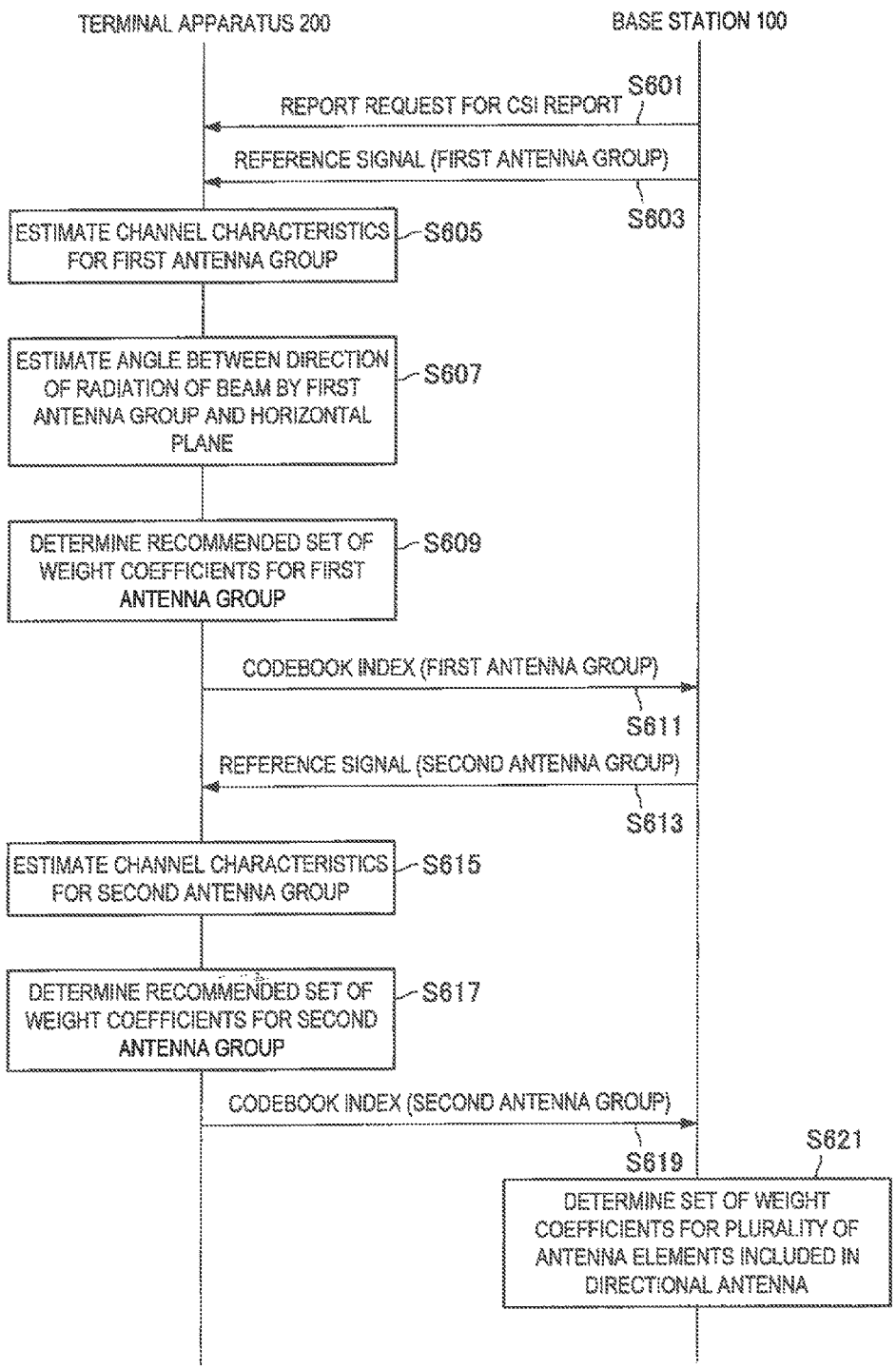
FIG. 20 is a sequence diagram showing an example of a schematic flow of an entire communication control process according to a third variation.

FIG. 20 is a sequence diagram showing an example of a schematic flow of an entire communication control process according to the third variation.

Initially, the base station 100 performs report request for a CSI report (S601).

Thereafter, the base station 100 transmits a reference signal using the first antenna group (S603).

Thereafter, a terminal apparatus 200 estimates channel characteristics (channel matrix) for the first antenna group (S605). Thereafter, the terminal apparatus 200 calculates, from the estimated channel characteristics, the angle between the direction of radiation of a beam aimed at the terminal apparatus 200 that is performed by the first antenna group and the horizontal plane (S607). Moreover, the terminal apparatus 200 determines a recommended set of weight coefficients for the first antenna group, on the basis of the estimated channel characteristics (S609). For example, when the angle is outside a predetermined angle range, the terminal apparatus 200 determines, as the recommended set, a set of weight coefficients for forming a beam having a weaker directivity.

Thereafter, the terminal apparatus 200 notifies the base station 100 of a codebook index indicating the recommended set thus determined (a codebook index for the first antenna group) (S611). For example, the terminal apparatus 200 notifies of the codebook index in a sub-frame that is the fourth sub-frame after a sub-frame in which the reference signal has been transmitted.

Also, the base station 100 transmits a reference signal using the second antenna group (S613).

Thereafter, the terminal apparatus 200 estimates channel characteristics (channel matrix) for the second antenna group (S615). Thereafter, the terminal apparatus 200 determines a recommended set of weight coefficients for the second antenna group, on the basis of the estimated channel characteristics (S617). For example, when the angle is outside a predetermined angle range, the terminal apparatus 200 determines, as the recommended set, a set of weight coefficients for forming a beam having a weaker directivity.

Thereafter, the terminal apparatus 200 notifies the base station 100 of a codebook index indicating the recommended set thus determined (a codebook index for the second antenna group) (S619). For example, the terminal apparatus 200 notifies of the codebook index in a sub-frame that is the fourth sub-frame after a sub-frame in which the reference signal has been transmitted.

Thereafter, the base station 100 determines a set of weight coefficients for the plurality of antenna elements included in the directional antenna 101, on the basis of the recommended set of weight coefficients for the first antenna group and the recommended set of weight coefficients for the second antenna group (S621). The determined set of weight coefficients is a set of weight coefficients that is used by the plurality of antenna elements to form a beam aimed at the terminal apparatus 200 (e.g., a three-dimensional beam, a two-dimensional beam, a non-directional beam, etc.).

In the foregoing, specific details of the third variation have been described. The third variation is not limited to the above example.

As an example, the terminal apparatus 200 may notify the base station of a recommended set of weight coefficients for each antenna group, without considering whether the angle is within a predetermined angle range. When the angle is outside the predetermined angle range, the base station 100 may acquire weight coefficients having a weaker directivity, instead of the recommended set notified, for at least one antenna group.

As another example, as in the second variation, the terminal apparatus 200 may transmit a reference signal, and the base station 100 may estimate channel characteristics on the basis of reception of the reference signal. When the angle is outside a predetermined angle range, the base station 100 may acquire weight coefficients having a weaker directivity for at least one antenna group.

5.4. Fourth Variation

Next, a fourth variation of the embodiment of the present disclosure will be described with reference to FIG. 21 and FIG. 22.

According to the fourth variation, the number of antenna elements for forming a beam aimed at a terminal apparatus 200 varies depending on an angle between the direction of radiation of a beam aimed at the terminal apparatus 200 and the horizontal plane.

Specifically, when the above angle is within a predetermined angle range, the base station 100 determines a set of weight coefficients for the plurality of antenna elements included in the directional antenna 101. Alternatively, when the angle is outside the predetermined angle range, the base station 100 determines a set of weight coefficients for a smaller number of antenna elements than the plurality of antenna elements included in the directional antenna 101.

(Base Station 100: Information Acquisition Unit 153)

In the fourth variation, when an angle between the direction of radiation of a beam aimed at a terminal apparatus 200 and the horizontal plane is within a predetermined angle range, the information acquisition unit 153 acquires a set of weight coefficients for forming a beam aimed at the terminal apparatus 200, for each of the two or more antenna groups.

Alternatively, when the angle between the direction of radiation of a beam aimed at the terminal apparatus 200 and the horizontal plane is outside the predetermined angle range, the information acquisition unit 153 acquires, for example, a set of weight coefficients for a smaller number of antenna elements than the plurality of antenna elements, that is used to form a beam aimed at the terminal apparatus 200.

Specifically, for example, referring to the example of FIG. 10, for example, a terminal apparatus 200 estimates channel characteristics on the basis of reception of a reference signal transmitted by the first antenna group 105. Thereafter, the terminal apparatus 200 calculates, from the estimated channel characteristics, an angle between the direction of radiation of a beam aimed at the terminal apparatus 200 by the first antenna group 105 and the horizontal plane. For example, the angle is within a predetermined angle range (e.g., the range between −A and A). In this case, as in the above example of the embodiment, the terminal apparatus 200 determines a recommended set of weight coefficients for forming a beam aimed at the terminal apparatus 200, for each of the first antenna group 105 and the second antenna group 107. Alternatively, for example, the angle is outside the predetermined angle range. In this case, the terminal apparatus 200 determines a recommended et of weight coefficients for a smaller number of antenna elements than the plurality of antenna elements included in the directional antenna 101, instead of determining a recommended set for the first antenna group 105 and the second antenna group 107. As an example, a recommended set of weight coefficients is determined for 4 (2×2) or 16 (4×4) antenna elements, which are fewer than 64 (8×8) antenna elements. Thereafter, the terminal apparatus 200 notifies the base station 100 of the recommended set. Thereafter, the information acquisition unit 153 acquires the recommended set thus notified. The information acquisition unit 153 acquires a recommended set for the first antenna group 105 and the second antenna group 107 when the angle within the predetermined angle range, and a recommended set for a smaller number of antenna elements when the angle is outside the predetermined angle range.

Note that the angle calculation technique and the technique of determining whether the angle is within the predetermined angle range, are the same as those described above in connection with the third variation.

(Base Station 100: Weight Determination Unit 155)

For example, the angle between the direction of radiation of a beam aimed at a terminal apparatus 200 and the horizontal plane is within the predetermined angle range. In the fourth variation, in this case, the weight determination unit 155 determines a set of weight coefficients for the plurality of antenna elements, on the basis of the above sets of the weight coefficients for the two or more antenna groups.

Alternatively, for example, the angle between the direction of radiation of a beam aimed at a terminal apparatus 200 and the horizontal plane is outside the predetermined angle range. In the fourth variation, in this case, the weight determination unit 155 determines a set of weight coefficients for a smaller number of antenna elements than the plurality of antenna elements that is used to form a beam aimed at the terminal apparatus 200.

As a specific example, as described above, when the angle is outside the predetermined angle range, the information acquisition unit 153 acquires a recommended set for a smaller number of antenna elements. Thereafter, the weight determination unit 155 determines the recommended set for a smaller number of antenna elements, as a set of weight coefficients for forming a beam aimed at the terminal apparatus 200. As an example, a set of weight coefficients is determined for 4 (2×2) or 16 (4×4) antenna elements, which are fewer than 64 (8×8) antenna elements. Thereafter, the smaller number of antenna elements are used to transmit a signal to the terminal apparatus 200.

Thus, according to the fourth variation, a beam having a weaker directivity is used for a terminal apparatus 200 for which it is not necessary to use a three-dimensional beam, and a three-dimensional beam can be used for a terminal apparatus 200 for which it is necessary to use a three-dimensional beam. For example, a three-dimensional beam can be used for a terminal apparatus 200 that is located at a cell edge, a terminal apparatus 200 that is assumed to be located on an upper floor of a building, or the like. As a result, in a communication system, processing load can be reduced while communication quality is improved.

Moreover, for example, the number of antenna elements used for transmission of a signal to a terminal apparatus 200 is reduced, and therefore, processing load can be reduced. Also, for example, a recommended set of weight coefficients for a smaller number of antenna elements (i.e., a set of weight coefficients in a smaller codebook) is notified, and therefore, the amount of information of codebook indices (i.e., the number of bits) is reduced. Therefore, overhead can be reduced.

(Terminal Apparatus 200: Estimated Weight Determination Unit 261)

For example, an angle between the direction of radiation of a beam aimed at a terminal apparatus 200 and the horizontal plane is within a predetermined angle range. In the fourth variation, in this case, the estimated weight determination unit 261 determines a recommended set of weight coefficients for forming a beam aimed at the terminal apparatus 200, for each of the two or more antenna groups.

Alternatively, for example, the angle between the direction of radiation of a beam aimed at a terminal apparatus 200 and the horizontal plane is outside the predetermined angle range. In the fourth variation, in this case, the estimated weight determination unit 261 determines a recommended set of weight coefficients for forming a beam aimed at the terminal apparatus 200, for a smaller number of antenna elements than the plurality of antenna elements.

As described above, for example, the estimated weight determination unit 261 estimates channel characteristics on the basis of reception of a reference signal transmitted by the first antenna group 105, and calculates, from the estimated channel characteristics, the angle between the direction of radiation of a beam aimed at a terminal apparatus 200 and the horizontal plane. For example, the angle is within a predetermined angle range. In this case, as in the above example of the embodiment, the estimated weight determination unit 261 determines a recommended set of weight coefficients for forming a beam aimed at the terminal apparatus 200, for each of the first antenna group 105 and the second antenna group 107. Alternatively, for example, the angle is outside the predetermined angle range. In this case, the estimated weight determination unit 261 determines a recommended set of weight coefficients for a smaller number of antenna elements than the plurality of antenna elements included in the directional antenna 101, instead of determining a recommended set for the first antenna group 105 and the second antenna group 107. As an example, a set of weight coefficients is determined for 4 (2×2) or 16 (4×4) antenna elements, which are fewer than 64 (8×8) antenna elements. Thereafter, the notification unit 263 notifies the base station 100 of the recommended set.

(Flow of Process)

Case where Angle is within Angle Range

Figure 21:
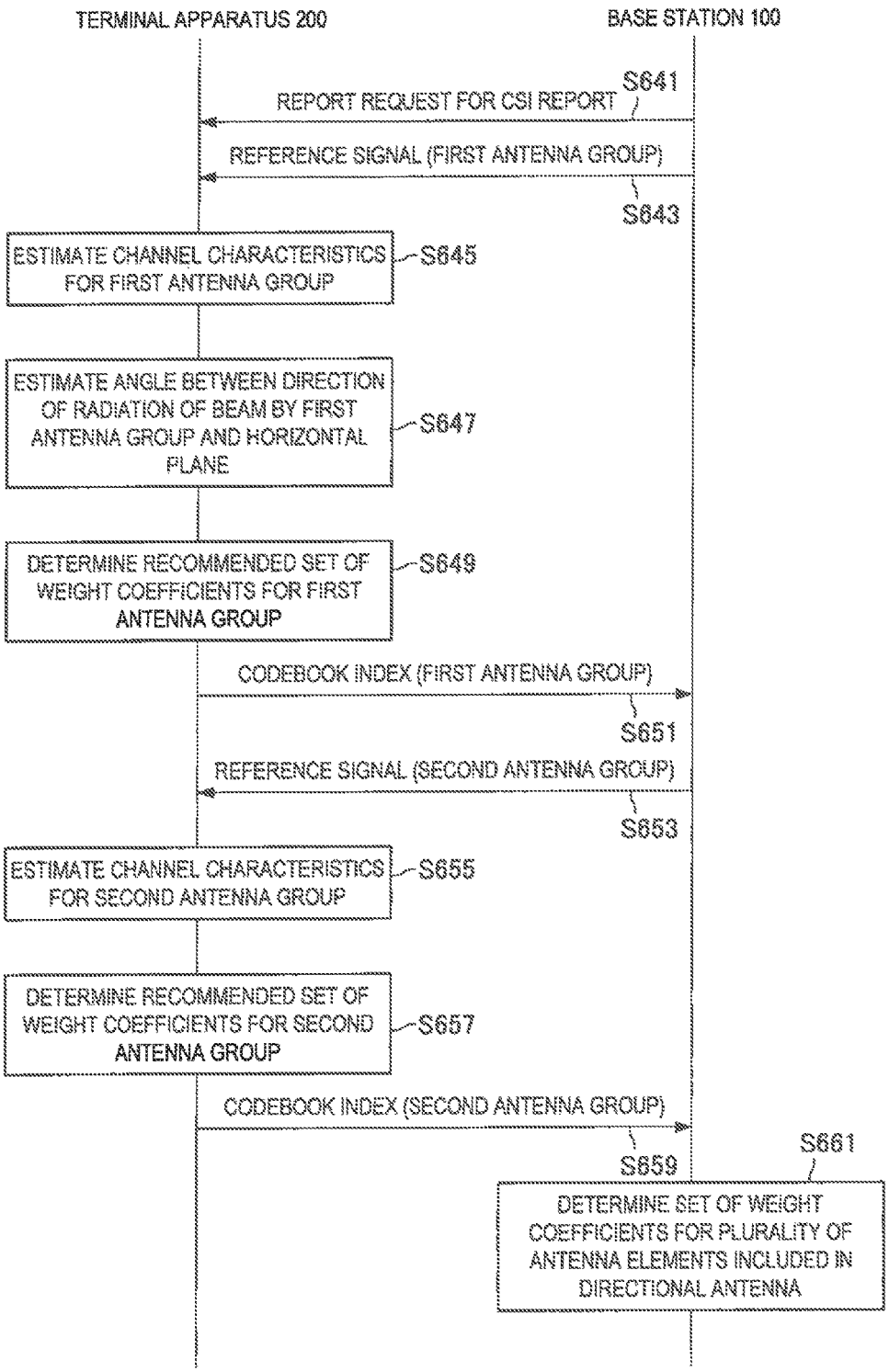
FIG. 21 is a sequence diagram showing a first example of a schematic flow of an entire communication control process according to a fourth variation.

FIG. 21 is a sequence diagram showing a first example of a schematic flow of an entire communication control process according to the fourth variation. The first example is an example of a case where an angle between the direction of radiation of a beam aimed at a terminal apparatus 200 and the horizontal plane is within a predetermined angle range.

Initially, the base station 100 performs report request for a CSI report (S641).

Thereafter, the base station 100 transmits a reference signal using the first antenna group (S643).

Thereafter, a terminal apparatus 200 estimates channel characteristics (channel matrix) for the first antenna group (S645). Thereafter, the terminal apparatus 200 calculates, from the estimated channel characteristics, the angle between the direction of radiation of a beam aimed at the terminal apparatus 200, that is performed by the first antenna group, and the horizontal plane (S647). In this example, the angle is within the predetermined angle range, and therefore, the terminal apparatus 200 determines a recommended set of weight coefficients for the first antenna group, on the basis of the estimated channel characteristics (S649).

Thereafter, the terminal apparatus 200 notifies the base station 100 of a codebook index indicating the recommended set thus determined (a codebook index for the first antenna group) (S651). For example, the terminal apparatus 200 notifies of the codebook index in a sub-frame that is the fourth sub-frame after a sub-frame in which the reference signal has been transmitted.

Also, the base station 100 transmits a reference signal using the second antenna group (S653).

Thereafter, the terminal apparatus 200 estimates channel characteristics (channel matrix) for the second antenna group (S655). In this example, the angle is within the predetermined angle range, and therefore, the terminal apparatus 200 determines a recommended set of weight coefficients for the second antenna group, on the basis of the estimated channel characteristics (S657).

Thereafter, the terminal apparatus 200 notifies the base station 100 of a codebook index indicating the recommended set thus determined (a codebook index for the second antenna group) (S659). For example, the terminal apparatus 200 notifies of the codebook index in a sub-frame that is the fourth sub-frame after a sub-frame in which the reference signal has been transmitted.

Thereafter, the base station 100 determines a set of weight coefficients for the plurality of antenna elements included in the directional antenna 101, on the basis of the recommended set of weight coefficients for the first antenna group and the recommended set of weight coefficients for the second antenna group (S661). The determined set of weight coefficients is a set of weight coefficients that is used by the plurality of antenna elements to form a three-dimensional beam aimed at the terminal apparatus 200.

Case where Angle is Outside Angle Range

Figure 22:
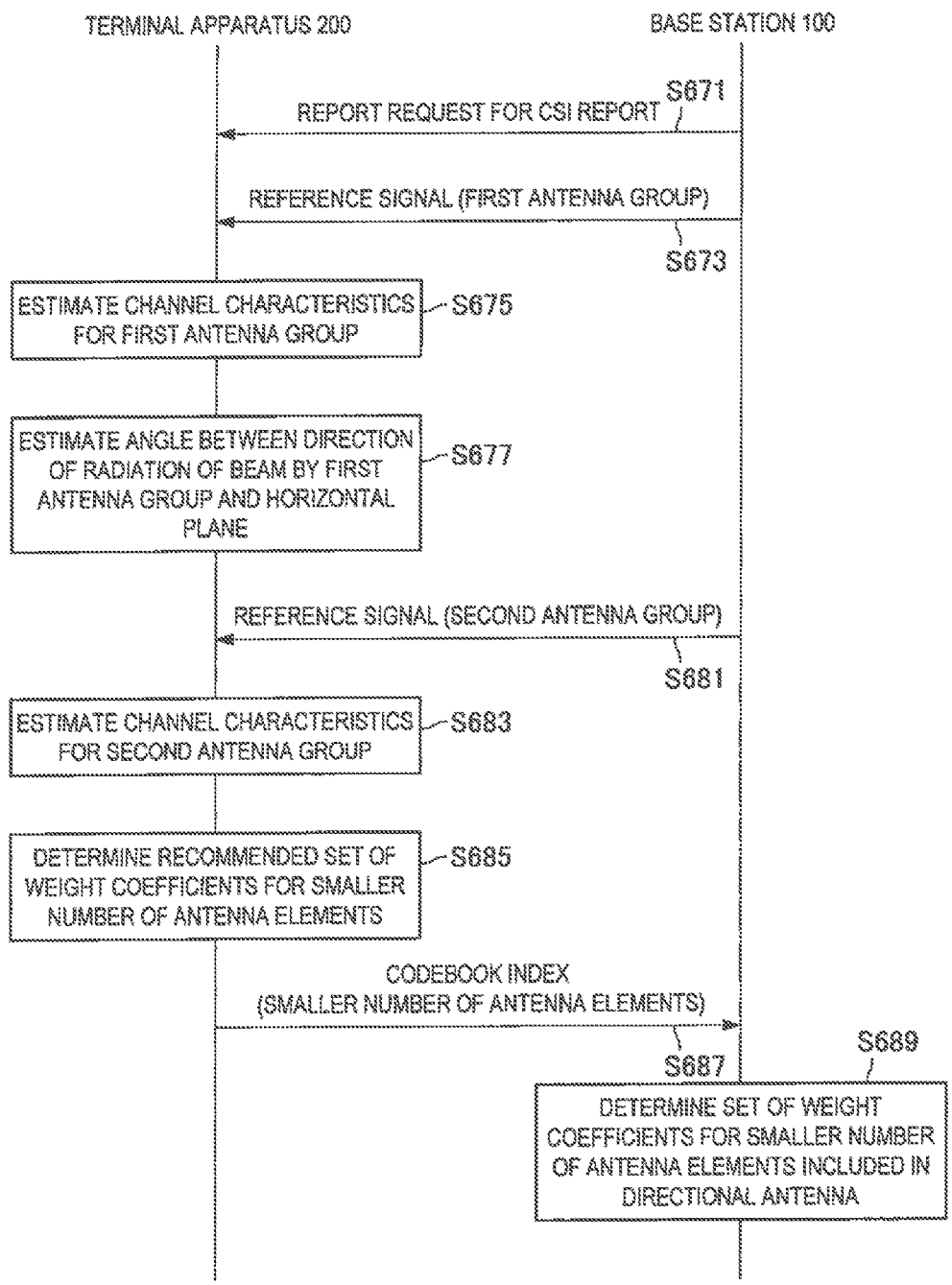
FIG. 22 is a sequence diagram showing a second example of a schematic flow of an entire communication control process according to the fourth variation.

FIG. 22 is a sequence diagram showing a second example of a schematic flow of an entire communication control process according to the fourth variation. The second example is an example of a case where an angle between the direction of radiation of a beam aimed at a terminal apparatus 200 and the horizontal plane is outside a predetermined angle range.

Initially, the base station 100 performs report request for a CSI report (S671).

Thereafter, the base station 100 transmits a reference signal using the first antenna group (S673).

Thereafter, a terminal apparatus 200 estimates channel characteristics (channel matrix) for the first antenna group (S675). Thereafter, the terminal apparatus 200 calculates, from the estimated channel characteristics, the angle between the direction of radiation of a beam aimed at the terminal apparatus 200, that is performed by the first antenna group, and the horizontal plane (S677). In this example, the angle is outside the predetermined angle range.

Also, the base station 100 transmits a reference signal using the second antenna group (S681).

Thereafter, the terminal apparatus 200 estimates channel characteristics (channel matrix) for the second antenna group (S683).

In this example, the angle is outside the predetermined angle range, and therefore, the terminal apparatus 200 determines a recommended set of weight coefficients for a smaller number of antenna elements than the plurality of antenna elements included in the directional antenna 101 (S685).

Thereafter, the terminal apparatus 200 notifies the base station 100 of a codebook index indicating the recommended set thus determined (a codebook index indicating a smaller number of antenna elements) (S687).

Thereafter, the base station 100 determines a set of weight coefficients for a smaller number of antenna elements included in the directional antenna, on the basis of the recommended set of weight coefficients for the smaller number of antenna elements (S689). The determined set of weight coefficients is a set of weight coefficients that is used by the smaller number of antenna elements to form a beam aimed at the terminal apparatus 200 (e.g., a three-dimensional beam, a two-dimensional beam, a non-directional beam, etc.).

In the foregoing, specific details of the fourth variation have been described. The fourth variation is not limited to the above example.

As an example, a smaller number of antenna elements than the plurality of antenna elements may be antenna elements included in a portion of the two or more antenna groups. As a specific example, when the angle between the direction of radiation of a beam aimed at a terminal apparatus 200, that is performed by the first antenna group, and the horizontal plane is outside a predetermined angle range, the terminal apparatus 200 may determine a recommended set for one of the first antenna group and the second antenna group. Thereafter, the base station 100, when notified of the recommended set, may determine a set of weight coefficients for the above one of the first antenna group and the second antenna group, on the basis of the recommended set. Thereafter, a signal is transmitted to the terminal apparatus 200 using the above one of the first antenna group and the second antenna group.

6. Application Examples

Technology according to the present disclosure is applicable to various products. For example, a base station 100 may be realized as any type of evolved Node B (eNB) such as a macro eNB, a pico eNB, and a home eNB. Instead, the base station 100 may be realized as any other types of base stations such as a NodeB and a base transceiver station (BTS). The base station 100 may include a main body (that is also referred to as a base station apparatus) configured to control radio communication, and one or more remote radio heads (RRH) disposed in a different place from the main body.

For example, a terminal apparatus 200 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The terminal apparatus 200 may also be realized as a terminal (that is also referred to as a machine type communication (MTC) terminal) that performs machine-to-machine (M2M) communication. Furthermore, the terminal apparatus 200 may be a radio communication module (such as an integrated circuit module including a single die) mounted on each of the terminals.

6.1. Application Examples Regarding Base Station

First Application Example

Figure 23:
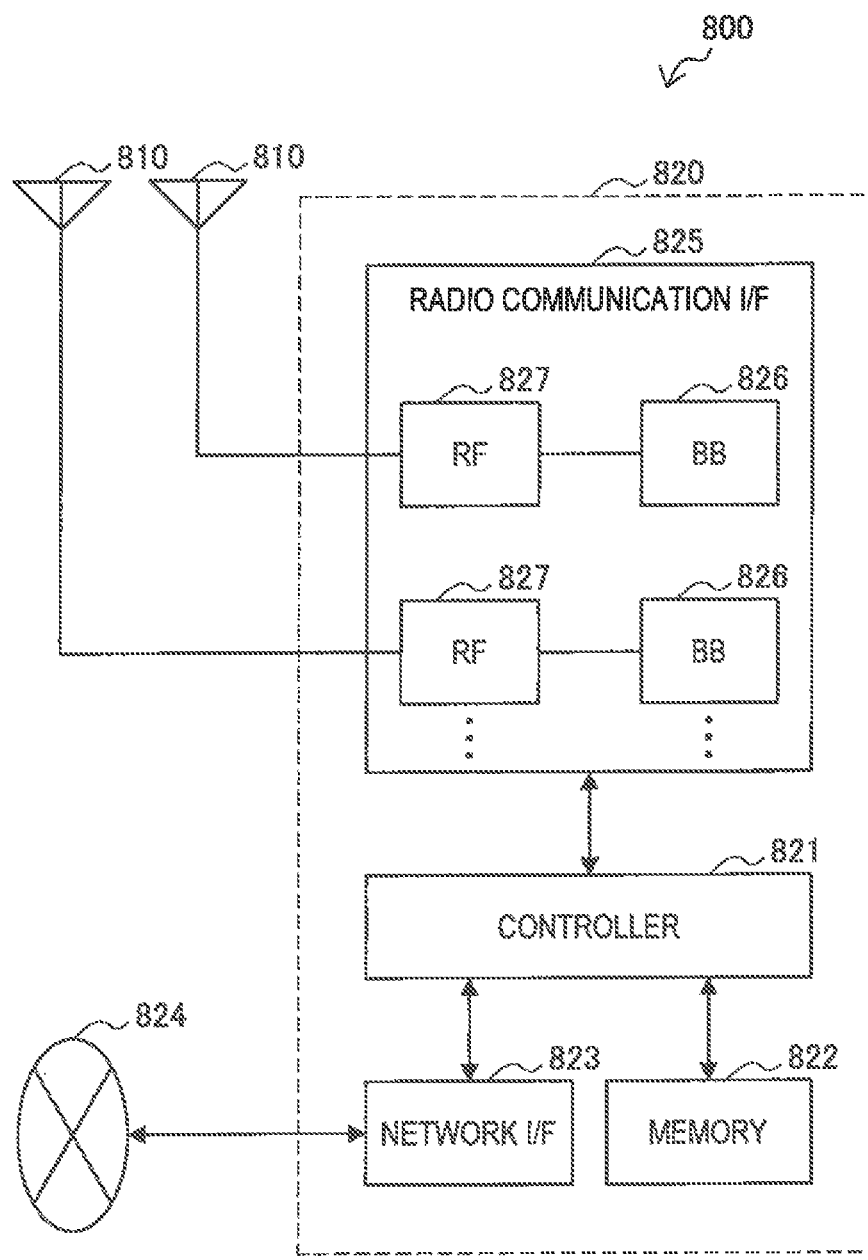
FIG. 23 is a block diagram illustrating a first example of a schematic configuration of an eNB to which the technology according to the present disclosure may be applied.

FIG. 23 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive radio signals. Particularly in the embodiment of the present disclosure, the at least one antenna 810 is a directional antenna capable of forming a three-dimensional beam. The eNB 800 may include the multiple antennas 810, as illustrated in FIG. 23. For example, the multiple antennas 810 may be compatible with multiple frequency bands used by the eNB 800. Although FIG. 23 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 23. For example, the multiple BB processors 826 may be compatible with multiple frequency bands used by the eNB 800. The radio communication interface 825 may include the multiple RF circuits 827, as illustrated in FIG. 23. For example, the multiple RF circuits 827 may be compatible with multiple antenna elements. Although FIG. 23 illustrates the example in which the radio communication interface 825 includes the multiple BB processors 826 and the multiple RF circuits 827, the radio communication interface 825 may also include a single BB processor 826 or a single RF circuit 827.

Second Application Example

Figure 24:
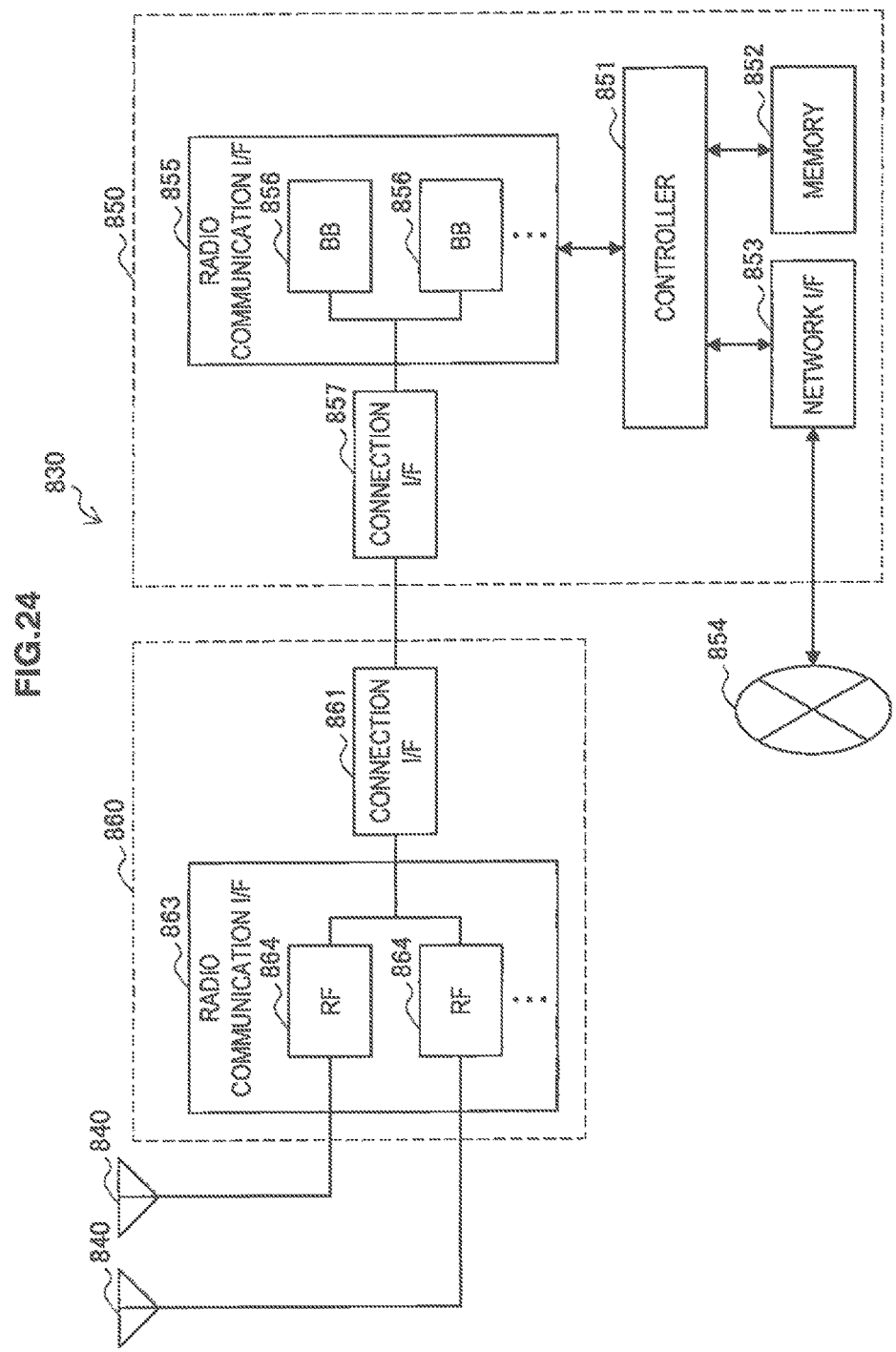
FIG. 24 is a block diagram illustrating a second example of a schematic configuration of an eNB to which the technology according to the present disclosure may be applied.

FIG. 24 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. Particularly in the embodiment of the present disclosure, the at least one antenna 840 is a directional antenna capable of forming a three-dimensional beam. The eNB 830 may include the multiple antennas 840, as illustrated in FIG. 24. For example, the multiple antennas 840 may be compatible with multiple frequency bands used by the eNB 830. Although FIG. 24 illustrates the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 23.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 23, except the BB processor 856 is connected to the RF circuit 864 of the RRH 860 via the connection interface 857. The radio communication interface 855 may include the multiple BB processors 856, as illustrated in FIG. 24. For example, the multiple BB processors 856 may be compatible with multiple frequency bands used by the eNB 830. Although FIG. 24 illustrates the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 24. For example, the multiple RF circuits 864 may support multiple antenna elements. Although FIG. 24 illustrates the example in which the radio communication interface 863 includes the multiple RF circuits 864, the radio communication interface 863 may also include a single RF circuit 864.

In the eNB 800 and the eNB 830 shown in FIG. 23 and FIG. 24, the transmission control unit 151, the information acquisition unit 153, and the weight determination unit 155 that are described with reference to FIG. 9 may be provided in the radio communication interface 825 and the radio communication interface 855 and/or the radio communication interface 863. Also, at least a portion of these functions may be achieved by the controller 821 and the controller 851.

6.2. Application Examples Regarding Terminal Apparatus

First Application Example

Figure 25:
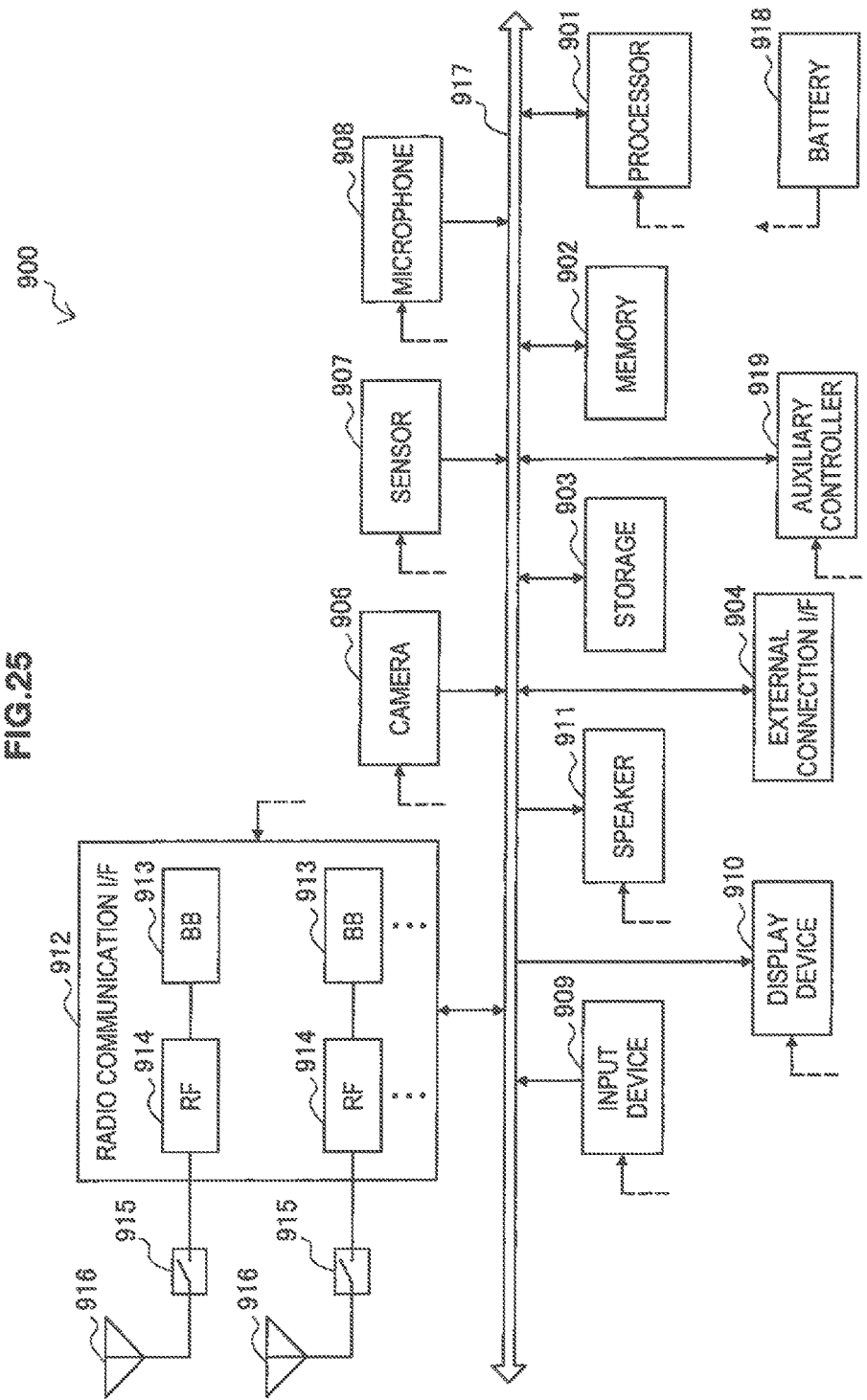
FIG. 25 is a block diagram illustrating an example of a schematic configuration of a smartphone to which the technology according to the present disclosure may be applied.

FIG. 25 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 25. Although FIG. 25 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 25. Although FIG. 25 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 25 via feeder lines, which are partially shown as dashed lines in the figure. The auxiliary controller 919 operates a minimum necessary function of the smartphone 900, for example, in a sleep mode.

In the smartphone 900 shown in FIG. 25, the recommended weight determination unit 261 and the notification unit 263 that are described with reference to FIG. 14 may be provided in the radio communication interface 912. Also, at least a portion of these functions may be achieved by the processor 901 or the auxiliary controller 919.

Second Application Example

Figure 26:
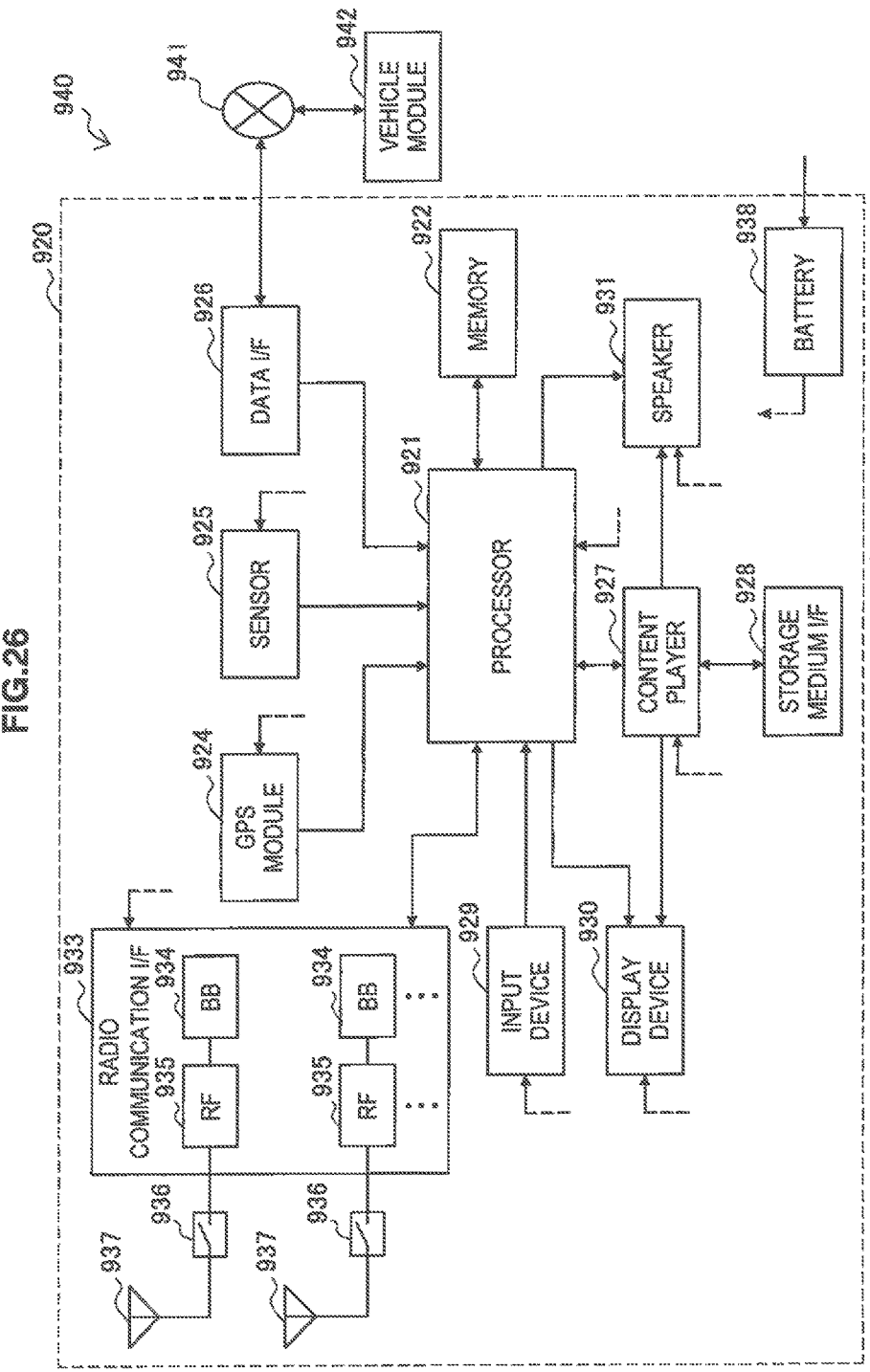
FIG. 26 is a block diagram illustrating an example of a schematic configuration of a car navigation apparatus to which the technology according to the present disclosure may be applied.

FIG. 26 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 26. Although FIG. 26 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 26. Although FIG. 26 illustrates the example in which the car navigation apparatus 920 includes the multiple antennas 937, the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. T26 via feeder lines that are partially shown as dashed lines in the figure. The battery 938 accumulates power supplied form the vehicle.

In the car navigation apparatus 920 shown in FIG. 26, the recommended weight determination unit 261 and the notification unit 263 that are described with reference to FIG. 14 may be provided in the radio communication interface 933. Also, at least a portion of these functions may be achieved by the processor 921.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

7. Conclusion

In the foregoing, apparatuses and processes according to an embodiment of the present disclosure have been described with reference to FIG. 6 to FIG. 26. According to the embodiment of the present disclosure, the information acquisition unit 153 acquires a set of weight coefficients for forming a beam aimed at a terminal apparatus 200 for each of two or more antenna groups each including a portion of the plurality of antenna elements included in the directional antenna 101 that can be used to form a three-dimensional beam. Thereafter, the weight determination unit 155 determines a set of weight coefficients for the plurality of antenna elements that is used to form a three-dimensional beam aimed at the terminal apparatus 200, on the basis of the above sets of the weight coefficients for the two or more antenna groups.

As a result, load involved in beamforming can be reduced. As an example, instead of directly calculating a set of weight coefficients for a large number of antenna elements, a set of weight coefficients for a smaller number of antenna elements may be calculated for each antenna group, and therefore, processing load for calculation of a set of weight coefficients can be reduced. Also, as another example, instead of notifying of a codebook index indicating a set of weight coefficients for a large number of antenna elements, a combination of codebook indices indicating a set of weight coefficients for a smaller number of antenna elements may be notified, and therefore, overhead for notification can be reduced. Also, as still another example, instead of transmitting a reference signal using a large number of antenna elements, a reference signal may be transmitted using a smaller number of antenna elements for each antenna group, and therefore, overhead for transmitting a reference signal can be reduced. For example, thus, load involved in beamforming can be reduced in terms of processing, radio resources, or the like.

Transmission of Reference Signal by Base Station

Moreover, for example, the transmission control unit 151 controls transmission of a reference signal by each of the two or more antenna groups.

As a result, for example, a terminal apparatus 200 can estimate channel characteristics on the basis of reception of a reference signal transmitted by each antenna group. Thereafter, the terminal apparatus 200 can calculate a set of weight coefficients that is used by each antenna group to form a beam aimed at the terminal apparatus 200, on the basis of the estimated channel characteristics.

As a specific example, the transmission control unit 151 controls transmission of a reference signal that is performed by each of the two or more antenna groups so that the two or more antenna groups transmit a reference signal in resource blocks having different times within a frequency band having at least any band width.

As a result, for example, a terminal apparatus 200 can estimate a channel in the same frequency band or a close frequency band for two or more antenna groups.

Moreover, as a specific example, the transmission control unit 151 controls transmission of a reference signal that is performed by each of the two or more antenna groups so that the two or more antenna groups transmit a reference signal in resource blocks having different frequency bands within at least any time.

As a result, for example, a terminal apparatus 200 can estimate a channel for any of two or more antenna groups quickly without waiting.

Acquisition of Recommended Set of Weight Coefficients

For example, the information acquisition unit 153 acquires a recommended set of weight coefficients notified by a terminal apparatus 200, as the above set of the weight coefficients.

As a result, for example, the base station 100 can acquire a set of weight coefficients for forming a beam aimed at a terminal apparatus 200, for each antenna group.

The notification of the recommended set is, for example, notification of an index indicating one of a plurality of candidate recommended sets of weight coefficients.

As a result, for example, overhead can be reduced.

Reception of Reference Signal by Base Station

In the first variation, the information acquisition unit 153 acquires a set of weight coefficients that is calculated on the basis of reception of a reference signal transmitted by a terminal apparatus 200, as a set of weight coefficients for forming a beam aimed at the terminal apparatus 200.

As a result, for example, the base station 100 can acquire a set of weight coefficients for forming a beam aimed at a terminal apparatus 200, for each antenna group.

Set of Weight Coefficients Depending on Angle Between Direction of Radiation of Beam Aimed at Terminal Apparatus and Horizontal Plane In the third variation, the information acquisition unit 153 acquires a set of weight coefficients for forming a beam having a weaker directivity, as the above set of weight coefficient, for at least one antenna group, when an angle between the direction of radiation of a beam aimed at a terminal apparatus 200 and the horizontal plane is outside a predetermined angle range than when the angle is within the angle range. For example, the angle between the direction of radiation of a beam aimed at a terminal apparatus 200 and the horizontal plane is within the predetermined angle range. In this case, the weight determination unit 155 determines a set of weight coefficients for the plurality of antenna elements that is used to form a three-dimensional beam aimed at the terminal apparatus 200. Alternatively, for example, the angle between the direction of radiation of a beam aimed at the terminal apparatus 200 and the horizontal plane is outside the predetermined angle range. In this case, the weight determination unit 155 determines a set of weight coefficients for the plurality of antenna elements that is used to form a beam aimed at the terminal apparatus 200.

As a result, for example, a beam having a weaker directivity can be used for a terminal apparatus 200 for which it is not necessary to use a three-dimensional beam, and a three-dimensional beam can be used for a terminal apparatus 200 for which it is necessary to use a three-dimensional beam. For example, a three-dimensional beam can be used for a terminal apparatus 200 that is located at a cell edge, a terminal apparatus 200 that is assumed to be located on an upper floor of a building, or the like. As a result, in a communication system, processing load can be reduced while communication quality is improved.

In the fourth variation, for example, an angle between the direction of radiation of a beam aimed at a terminal apparatus 200 and the horizontal plane is within a predetermined angle range. In this case, the information acquisition unit 153 acquires a set of weight coefficients for forming a beam aimed at the terminal apparatus 200, for each of the two or more antenna groups. Thereafter, the weight determination unit 155 determines a set of weight coefficients for the plurality of antenna elements, on the basis of the above sets of the weight coefficients for the two or more antenna groups. Alternatively, for example, the angle between the direction of radiation of a beam aimed at a terminal apparatus 200 and the horizontal plane is outside the predetermined angle range. In this case, the weight determination unit 155 determines a set of weight coefficients for a smaller number of antenna elements than the plurality of antenna elements, that is used to form a beam aimed at the terminal apparatus 200.

As a result, for example, a beam having a weaker directivity can be used for a terminal apparatus 200 for which it is not necessary to use a three-dimensional beam, and a three-dimensional beam can be used for a terminal apparatus 200 for which it is necessary to use a three-dimensional beam. For example, a three-dimensional beam can be used for a terminal apparatus 200 that is located at a cell edge, a terminal apparatus 200 that is assumed to be located on an upper floor of a building, or the like. As a result, in a communication system, processing load can be reduced while communication quality is improved.

Moreover, for example, the number of antenna elements used for transmitting a signal to a terminal apparatus 200 is reduced, and therefore, processing load can be reduced. Also, for example, a recommended set of weight coefficients (i.e., a set of weight coefficients contained in a smaller codebook) for a smaller number of antenna elements is notified, and therefore, the amount of information of codebook indices (e.g., the number of bits) is reduced. Therefore, overhead can be reduced.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, although an example of determination of a set of weight coefficients for beamforming has been described, another set of weight coefficients for transmission in a plurality of layers (e.g., a dual layer) may be determined in addition to that set of weight coefficients. In other words, in addition to a precoding matrix for precoding of a second stage, another precoding matrix may be determined for precoding of a first stage. Thus, even when transmission is performed in a plurality of layers, a precoding matrix (a set of weight coefficients) for beamforming can be similarly determined.

Also, for example, although it has been assumed that a directional antenna includes a plurality of antenna elements, and a set of weight coefficients is determined for the plurality of antennas, the directional antenna may include one or more additional antenna elements in addition to that plurality of antenna elements. Also, although an example in which the plurality of antenna elements are arranged in a square or a rectangle, the present disclosure is not limited to such examples. For example, the plurality of antenna elements may be arranged in other patterns (e.g., a parallelogram, trapezoid, triangle, circle, etc.).

Also, the processing steps in a communication control process in this specification are not strictly limited to being executed in a time series following the sequence described in a flowchart. For example, the processing steps in a communication control process may be executed in a sequence that differs from a sequence described herein as a flowchart, and furthermore may be executed in parallel.

In addition, it is possible to create a computer program for causing hardware such as a CPU, ROM, and RAM built into a communication control device (a device of a base station or a terminal apparatus) or a terminal apparatus to exhibit functions similar to each structural element of the foregoing communication control device. Also, a storage medium having such a computer program stored therein may also be provided. Also, an information processing device (for example, a processing circuit or chip) equipped with memory storing such a computer program (for example, ROM and RAM) and processors that execute such a computer program (a CPU, for example) may also be provided.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A communication control apparatus including:

an acquisition unit configured to acquire a set of weight coefficients for forming a beam aimed at a terminal apparatus, for each of two or more antenna groups each including a portion of a plurality of antenna elements included in a directional antenna capable of forming a three-dimensional beam; and a determination unit configured to determine a set of weight coefficients for the plurality of antenna elements for forming a three-dimensional beam aimed at the terminal apparatus, on the basis of the sets of the weight coefficients for the two or more antenna groups.

(2)

The communication control apparatus according to (1), wherein the two or more antenna groups include a first antenna group including at least two antenna elements arranged in a first direction, and a second antenna group including at least two antenna elements arranged in a second direction different from the first direction.

(3)

The communication control apparatus according to (2), wherein the plurality of antenna elements are arranged along a plane parallel to the first direction and the second direction.

(4)

The communication control apparatus according to (2) or (3), wherein the first direction and the second direction are orthogonal to each other.

(5)

The communication control apparatus according to (4), wherein the second direction is parallel to a horizontal plane.

(6)

The communication control apparatus according to (4) or (5), wherein the determination unit determines the set of the weight coefficients for the plurality of antenna elements through multiplication of a matrix indicating a set of weight coefficients for the first antenna group by a matrix indicating a set of weight coefficients for the second antenna group.

(7)

The communication control apparatus according to any one of (1) to (6), further including:

a transmission control unit configured to control transmission of a reference signal performed by each of the two or more antenna groups.

(8)

The communication control apparatus according to (7), wherein the acquisition unit acquires, as the set of the weight coefficients, a recommended set of weight coefficients notified by the terminal apparatus.

(9)

The communication control apparatus according to (8), wherein the notification of the recommended set is notification of an index indicating one of a plurality of candidate recommended sets of weight coefficients.

(10)

The communication control apparatus according to (9), wherein the plurality of candidate recommended sets are a set of weight coefficients included in a codebook, and wherein the index is a codebook index in the codebook.

(11)

The communication control apparatus according to any one of (7) to (10), wherein the transmission control unit controls transmission of a reference signal performed by each of the two or more antenna groups in a manner that the two or more antenna groups transmit a reference signal in different resource blocks.

(12)

The communication control apparatus according to (11), wherein the transmission control unit controls transmission of a reference signal performed by each of the two or more antenna groups in a manner that the two or more antenna groups transmit a reference signal in resource blocks having different times within a frequency band having at least any band width.

(13)

The communication control apparatus according to (11) or (12), wherein the transmission control unit controls transmission of a reference signal performed by each of the two or more antenna groups in a manner that the two or more antenna groups transmit a reference signal in resource blocks having different frequency bands within at least any time.

(14)

The communication control apparatus according to any one of (1) to (6), wherein the acquisition unit acquires, as the set of the weight coefficients, a set of weight coefficients calculated on the basis of reception of a reference signal transmitted by the terminal apparatus.

(15)

The communication control apparatus according to any one of (1) to (14), wherein the acquisition unit acquires, as the set of the weight coefficients, a set of weight coefficients for forming a beam having a weaker directivity, for at least one antenna group of the two or more antenna groups, when an angle between the direction of radiation of a beam aimed at the terminal apparatus and a horizontal plane is outside a predetermined angle range than when the angle is within the angle range, and wherein the determination unit determines a set of weight coefficients for the plurality of antenna elements for forming a three-dimensional beam aimed at the terminal apparatus when the angle is within the predetermined angle range, and determines a set of weight coefficients for the plurality of antenna elements for forming a beam aimed at the terminal apparatus when the angle is outside the predetermined angle range.

(16)

The communication control apparatus according to any one of (1) to (14), wherein when an angle between the direction of radiation of a beam aimed at the terminal apparatus and a horizontal plane is within a predetermined angle range, the acquisition unit acquires the set of the weight coefficients for each of the two or more antenna groups, and wherein when the angle is within the predetermined angle range, the determination unit determines the set of weight coefficients for the plurality of antenna elements on the basis of the sets of the weight coefficients for the two or more antenna groups.

(17)

The communication control apparatus according to (16), wherein when the angle is outside the predetermined angle range, the determination unit determines a set of weight coefficients for a smaller number of antenna elements than the plurality of antenna elements, for forming a beam aimed at the terminal apparatus.

(18)

The communication control apparatus according to (17), wherein the smaller number of antenna elements than the plurality of antenna elements are included in a portion of the two or more antenna groups.

(19)

A communication control method including:

acquiring a set of weight coefficients for forming a beam aimed at a terminal apparatus, for each of two or more antenna groups each including a portion of a plurality of antenna elements included in a directional antenna capable of forming a three-dimensional beam; and determining a set of weight coefficients for the plurality of antenna elements for forming a three-dimensional beam aimed at the terminal apparatus, on the basis of the sets of the weight coefficients for the two or more antenna groups.

(20)

A terminal apparatus including:

a determination unit configured to determine a recommended set of weight coefficients for forming a beam aimed at the terminal apparatus, for each of two or more antenna groups each including a portion of a plurality of antenna elements included in a directional antenna capable of forming a three-dimensional beam, on the basis of reception of a reference signal transmitted by each of the two or more antenna groups; and a notification unit configured to notify of the recommended set for each of the two or more antenna groups, wherein the recommended sets for the two or more antenna groups are information used to determine a set of weight coefficients for the plurality of antenna elements for forming a three-dimensional beam aimed at the terminal apparatus.

REFERENCE SIGNS LIST 1 communication system
10 cell
20 three-dimensional beam
30 communication region
100 base station
151 transmission control unit
153 information acquisition unit
153 weight determination unit
200 terminal apparatus
261 recommended weight determination unit
263 notification unit

The invention claimed is:

1. A communication control apparatus, comprising:
at least one processor configured to:
acquire a first set of weight coefficients for each antenna group of a plurality of antenna groups of a base station,
wherein each antenna group of the plurality of antenna groups includes at least two antenna elements of a plurality of antenna elements of a directional antenna;
determine a second set of weight coefficients for a first number of antenna elements of the plurality of antenna elements, based on:
an angle, between a direction of radiation of a first beam aimed at a terminal apparatus and a horizontal plane, that is outside a threshold angle range; and
the first set of weight coefficients,
wherein a first count of the first number of antenna elements is smaller than a total count of the plurality of antenna elements; and
control the first number of antenna elements to form a second beam aimed at the terminal apparatus, based on the second set of weight coefficients.

2. The communication control apparatus according to claim 1,
wherein a first antenna group of the plurality of antenna groups comprises a first antenna element and a second antenna element of the plurality of antenna elements,
wherein both of the first antenna element and the second antenna element are in a first direction,
wherein a second antenna group of the plurality of antenna groups comprises a third antenna element and a fourth antenna element of the plurality of antenna elements, and
wherein both of the third antenna element and the fourth antenna element are in a second direction different from the first direction.

3. The communication control apparatus according to claim 2, wherein the plurality of antenna elements are along a plane parallel to the first direction and the second direction.

4. The communication control apparatus according to claim 2, wherein the first direction is orthogonal to the second direction.

5. The communication control apparatus according to claim 4, wherein the second direction is parallel to the horizontal plane.

6. The communication control apparatus according to claim 4, wherein the at least one processor is further configured to determine a third set of weight coefficients for the plurality of antenna elements, based on multiplication of a first matrix indicating a fourth set of weight coefficients for the first antenna group by a second matrix indicating a fifth set of weight coefficients for the second antenna group.

7. The communication control apparatus according to claim 1, wherein the at least one processor is further configured to control each antenna group of the plurality of antenna groups to transmit a reference signal.

8. The communication control apparatus according to claim 7, wherein the at least one processor is further configured to receive, from the terminal apparatus, notification information that indicates the first set of weight coefficients as a recommended set of weight coefficients.

9. The communication control apparatus according to claim 8, wherein the notification information comprises an index that indicates the recommended set of weight coefficients as one of a plurality of candidate recommended sets of weight coefficients.

10. The communication control apparatus according to claim 9,
wherein the plurality of candidate recommended sets of weight coefficients are included in a codebook, and
wherein the index is a codebook index in the codebook.

11. The communication control apparatus according to claim 7, wherein the at least one processor is further configured to control each antenna group of the plurality of antenna groups, to transmit the reference signal in a different resource block of a plurality of resource blocks.

12. The communication control apparatus according to claim 11, wherein the plurality of resource blocks have different sub-frames within a frequency band.

13. The communication control apparatus according to claim 11, wherein the plurality of resource blocks have different frequency bands within a sub-frame.

14. The communication control apparatus according to claim 7, wherein the terminal apparatus calculates the first set of weight coefficients based on the reference signal.

15. The communication control apparatus according to claim 1,
wherein a first directivity of the second beam is based on the angle that is outside the threshold angle range,
wherein a second directivity of a third beam is based on the angle that is within the threshold angle range,
wherein the first directivity is weaker than the second directivity, and
wherein the at least one processor is further configured to:
determine, based on the angle that is outside the threshold angle range, a third set of weight coefficients for the plurality of antenna elements; and
control the directional antenna to form one of a two-dimensional beam or a non-directional beam aimed at the terminal apparatus, based on the third set of weight coefficients.

16. The communication control apparatus according to claim 1, wherein the first number of antenna elements are included in at least two antenna groups of the plurality of antenna groups.

17. A communication control method, comprising:
acquiring a first set of weight coefficients for each antenna group of a plurality of antenna groups of a base station,
wherein each antenna group of the plurality of antenna groups includes at least two antenna elements of a plurality of antenna elements of a directional antenna;
determining a second set of weight coefficients for a first number of antenna elements of the plurality of antenna elements, based on:

an angle, between a direction of radiation of a first beam aimed at a terminal apparatus and a horizontal plane, that is outside a threshold angle range; and
the first set of weight coefficients,
   wherein a first count of the first number of antenna elements is smaller than a total count of the plurality of antenna elements; and
controlling the first number of antenna elements to form a second beam aimed at the terminal apparatus, based on the second set of weight coefficients.

18. A terminal apparatus, comprising:
at least one processor configured to:
   receive a reference signal from a base station;
   determine an angle between a direction of radiation of a first beam aimed at the terminal apparatus and a horizontal plane;
   determine, based on the reference signal and the angle that is outside a threshold range, a first set of weight coefficients for a first number of antenna elements of a plurality of antenna elements of the base station,
      wherein a first count of the first number of antenna elements is smaller than a total count of the plurality of antenna elements; and
   transmit to the base station, notification information that indicates the first set of weight coefficients.

* * * * *